(12) United States Patent
Yoshida

(10) Patent No.: US 11,836,461 B2
(45) Date of Patent: Dec. 5, 2023

(54) ARITHMETIC APPARATUS, MULTIPLY-ACCUMULATE SYSTEM, AND SETTING METHOD

(71) Applicant: Sony Group Corporation, Tokyo (JP)

(72) Inventor: Hiroshi Yoshida, Kanagawa (JP)

(73) Assignee: Sony Group Corporation, Tokyo (JP)

(*) Notice: Subject to any disclaimer, the term of this patent is extended or adjusted under 35 U.S.C. 154(b) by 186 days.

(21) Appl. No.: 17/425,055

(22) PCT Filed: Jan. 17, 2020

(86) PCT No.: PCT/JP2020/001471
§ 371 (c)(1),
(2) Date: Jul. 22, 2021

(87) PCT Pub. No.: WO2020/162141
PCT Pub. Date: Aug. 13, 2020

(65) Prior Publication Data
US 2022/0100469 A1 Mar. 31, 2022

(30) Foreign Application Priority Data
Feb. 4, 2019 (JP) .................................. 2019-018104

(51) Int. Cl.
*G06F 7/523* (2006.01)
*G06F 7/50* (2006.01)
(Continued)

(52) U.S. Cl.
CPC .............. *G06F 7/523* (2013.01); *G06F 7/50* (2013.01); *G06F 7/5443* (2013.01); *G06G 7/14* (2013.01); *G06G 7/16* (2013.01); *G06N 3/065* (2023.01)

(58) Field of Classification Search
CPC .......... G06F 7/50; G06F 7/523; G06F 7/5443; G06F 17/153; G06F 17/16; G06N 3/065;
(Continued)

(56) References Cited

U.S. PATENT DOCUMENTS

2018/0253643 A1* 9/2018 Buchanan .............. G06F 7/5443
2019/0171418 A1* 6/2019 Morie ....................... G06G 7/16
(Continued)

FOREIGN PATENT DOCUMENTS

| WO | 2018/034163 A1 | 2/2018 |
| WO | 2018/168293 A1 | 9/2018 |
| WO | 2018/235449 A1 | 12/2018 |

OTHER PUBLICATIONS

M. Yamaguchi et al., An Energy-efficient Time-domain Analog CMOS BinaryConnect Neural Network Processor Based on a Pulse-width Modulation Approach, IEEEAccess Multidisciplinary Rapid Review Open Access Journal, 2017 (Year: 2017).*
(Continued)

*Primary Examiner* — Emily E Larocque
(74) *Attorney, Agent, or Firm* — Michael Best & Friedrich LLP

(57) ABSTRACT

An arithmetic apparatus includes input lines and multiply-accumulate devices. An electrical signal for an input value is input into each of the input lines within a predetermined input period. Multiplication units include a positive weight multiplication unit that generates a positive weight charge for a product value obtained by multiplying the input value by a positive weight value and/or a negative weight multiplication unit that generates a negative weight charge for a product value obtained by multiplying the input value by a negative weight value. They are configured such that a positive weight ratio that is a ratio of a sum total of the positive weight values to a sum total of absolute values of the weight values is any ratio of 0% to 100%. An output unit
(Continued)

of the multiply-accumulate device accumulates the generated weight charges to output a multiply-accumulate signal representing a sum of the product values.

17 Claims, 14 Drawing Sheets

(51) Int. Cl.
 *G06G 7/14* (2006.01)
 *G06G 7/16* (2006.01)
 *G06F 7/544* (2006.01)
 *G06N 3/065* (2023.01)

(58) Field of Classification Search
 CPC . G06N 3/049; G06G 7/14; G06G 7/16; G11C 11/54
 See application file for complete search history.

(56) References Cited

U.S. PATENT DOCUMENTS

2022/0004853 A1* 1/2022 Shibata ................ G11C 13/003
2022/0045125 A1* 2/2022 Kimura ................. G06N 3/065

OTHER PUBLICATIONS

International Search Report (PCT/ISA/210), International Application No. PCT/JP2020/001471, dated Mar. 13, 2020.
Notification of Transmittal of the International Search Report and the Written Opinion of the International Searching Authority, or the Declaration (PCT/ISA/220), International Application No. PCT/JP2020/001471, dated Mar. 24, 2020.
Written Opinion of the International Search Authority (PCT/ISA/237), International Application No. PCT/JP2020/001471, dated Mar. 24, 2020.

* cited by examiner

Input period

A

Input period

B

□ : Synapse circuit
▷ : Neuron circuit

Post-neuron

ARITHMETIC APPARATUS, MULTIPLY-ACCUMULATE SYSTEM, AND SETTING METHOD

TECHNICAL FIELD

The present technology relates to an arithmetic apparatus, a multiply-accumulate system, and a setting method that can be applied to a multiply-accumulate operation using an analog method.

BACKGROUND ART

Conventionally, a technology for performing a multiply-accumulate operation has been developed. The multiply-accumulate operation is an operation of multiplying each of a plurality of input values by a weight and adding the multiplication results to each other, and is used for, for example, processing of recognizing images, voices, and the like through a neural network or the like.

For example, Patent Literature 1 describes an analog circuit in which multiply-accumulate processing is performed in an analog manner. In this analog circuit, a weight corresponding to each of a plurality of electrical signals is set. Moreover, charges depending on the corresponding electrical signals and weights are respectively output and the output charges are accumulated in a capacitor as appropriate. A value to be calculated, which represents a multiply-accumulate result, is calculated on the basis of the voltage of the capacitor in which the charges are accumulated. Accordingly, it is possible to reduce the power consumption required for the multiply-accumulate operation as compared with, for example, digital processing (paragraphs [0003], [0049] to [0053], and [0062] of specification, FIG. 3, and the like of Patent Literature 1).

CITATION LIST

Patent Literature

Patent Literature 1: WO 2018/034163

DISCLOSURE OF INVENTION

Technical Problem

The use of such an analog-type circuit is expected to lead to low power consumption of the neural network or the like, and it is desirable to provide a technology capable of accurately detecting the operation result.

In view of the above-mentioned circumstances, it is an object of the present technology to provide an arithmetic apparatus, a multiply-accumulate system, and a setting method, by which an operation result can be accurately detected in an analog-type circuit that performs a multiply-accumulate operation.

Solution to Problem

In order to accomplish the above-mentioned object, an arithmetic apparatus according to an embodiment of the present technology includes a plurality of input lines and a plurality of multiply-accumulate devices.

An electrical signal corresponding to an input value is input into each of the plurality of input lines within a predetermined input period.

The plurality of multiply-accumulate devices each includes a plurality of multiplication units and an output unit.

The plurality of multiplication units each generates, on the basis of the electrical signal input into each of the plurality of input lines, a charge corresponding to a product value obtained by multiplying the input value by a weight value.

The output unit accumulates a charge corresponding to the product value generated by each of the plurality of multiplication units and outputs, on the basis of the accumulated charge, a multiply-accumulate signal representing a sum of the product values.

Moreover, the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a positive weight ratio that is a ratio of a sum total of the positive weight values to a sum total of absolute values of the weight values is any ratio of 0% to 100%.

Moreover, the output unit accumulates at least one of the positive weight charge generated by the positive weight multiplication unit or the negative weight charge generated by the negative weight multiplication unit, to thereby output the multiply-accumulate signal.

Moreover, a duration of the input period is set on the basis of a distribution of the positive weight ratios of the plurality of multiply-accumulate devices.

In this arithmetic apparatus, the duration of the input period of the electrical signal corresponding to the input value is set on the basis of a distribution of the positive weight ratios of the plurality of multiply-accumulate devices. Accordingly, it is possible to increase the level of the multiply-accumulate signal output from each multiply-accumulate device while reducing the power consumption. As a result, it is possible to accurately detect an operation result.

The electrical signal corresponding to the input value may be a pulse signal having a duration of an ON time with respect to the input period, the duration corresponding to the input value.

The duration of the input period may be set on the basis of at least one of an average or a variance of the positive weight ratios.

The duration of the input period may be set to be longer as the positive weight ratios are more distributed close to 50%.

The duration of the input period may be set to be longer as the average of the positive weight ratios is closer to 50%.

The duration of the input period may be, in a case where the average of the positive weight ratios is close to 50%, set to be longer as the variance of the positive weight ratios is smaller.

The duration of the input period may be set on the basis of the number of multiply-accumulate devices of the plurality of multiply-accumulate devices which have a high possibility that the multiply-accumulate signal output from the output unit is lower than a noise level.

The arithmetic apparatus may further include a determination circuit for determining the number of multiply-accumulate devices of the plurality of multiply-accumulate devices which have a high possibility that the multiply-accumulate signal output from the output unit is lower than the noise level.

The determination circuit may include a plurality of determination multiplication units that each generates, on the basis of the electrical signal input into each of the plurality of input lines, a positive weight charge corresponding to a product value obtained by multiplying the input value by a positive weight value and a negative weight charge corresponding to a product value obtained by multiplying the input value by a negative weight value having an absolute value equal to the positive weight value, a determination output unit that outputs a determination signal on the basis of a charge corresponding to a difference between the total number of positive weight charges respectively generated by the plurality of determination multiplication units and the total number of negative weight charges respectively generated by the plurality of determination multiplication units, and a determination unit for determining the number of multiply-accumulate signals of the plurality of multiply-accumulate signals output from the plurality of arithmetic apparatuses, which are smaller than the determination signal.

The number of multiply-accumulate devices which have a high possibility that the multiply-accumulate signal output from the output unit is lower than the noise level may be determined on the basis of the number determined by the determination unit when electrical signals corresponding to a same input value are input in the plurality of input lines.

The output unit may include an accumulation unit that accumulates at least one of the positive weight charge generated by the positive weight multiplication unit or the negative weight charge generated by the negative weight multiplication unit and perform threshold determination on a voltage, which is retained by the accumulation unit, with a predetermined threshold value, to thereby output the multiply-accumulate signal representing the sum of the product values.

The accumulation unit may include a positive charge accumulation unit capable of accumulating the positive weight charge generated by the positive weight multiplication unit and a negative charge accumulation unit capable of accumulating the negative weight charge generated by the negative weight multiplication unit. In this case, the output unit may perform the threshold determination with the predetermined threshold value on each of the positive charge accumulation unit and the negative charge accumulation unit, to thereby output the multiply-accumulate signal.

The predetermined threshold value may be set on the basis of the duration of the input period.

The positive weight value and an absolute value of the negative weight value may be fixed to a same value. In this case, the positive weight ratio may be a ratio of the number of positive weight multiplication units to the number of multiplication units.

Each of the plurality of multiply-accumulate devices may include a positive charge output line and a negative charge output line. In this case, the plurality of multiplication units may be provided to be associated with the plurality of input lines. Moreover, the positive weight multiplication unit may include a resistor that is connected between an associated input line of the plurality of input lines and the positive charge output line, defines the positive weight value, and has a non-linear characteristic, and output a positive weight charge corresponding to the product value to the positive charge output line. Moreover, the negative weight multiplication unit may include a resistor that is connected between an associated input line of the plurality of input lines and the negative charge output line, defines the negative weight value, and has a non-linear characteristic, and output a negative weight charge corresponding to a product value to the negative charge output line.

The resistor of the positive weight multiplication unit and the resistor of the negative weight multiplication unit may have a same resistance value. In this case, the positive weight ratio may be a ratio of the number of resistors of the positive weight multiplication units to the total number of resistors.

The determination circuit may include a positive charge output line and a negative charge output line. In this case, the plurality of determination multiplication units may be provided to be associated with the plurality of input lines. Moreover, each of the plurality of determination multiplication units may include a common resistor that is connected to each of a portion between an associated input line of the plurality of input lines and the positive charge output line and a portion between an associated input line of the plurality of input lines and the negative charge output line and has a non-linear characteristic.

A multiply-accumulate system according to an embodiment of the present technology includes a plurality of input lines, a plurality of analog circuits, and a network circuit.

The plurality of analog circuits each includes a plurality of multiplication units and an output unit.

The network circuit is configured by connecting the plurality of analog circuits.

Moreover, a duration of the input period is set on the basis of a distribution of the positive weight ratios of the plurality of multiply-accumulate devices.

A setting method according to an embodiment of the present technology includes setting an input period for inputting an electrical signal into each of a plurality of input lines on the basis of a distribution of positive weight ratios of a plurality of multiply-accumulate devices.

MODE(S) FOR CARRYING OUT THE INVENTION

Hereinafter, embodiments according to the present technology will be described with reference to the drawings.

[Configuration of Arithmetic Apparatus]

Figure 1:
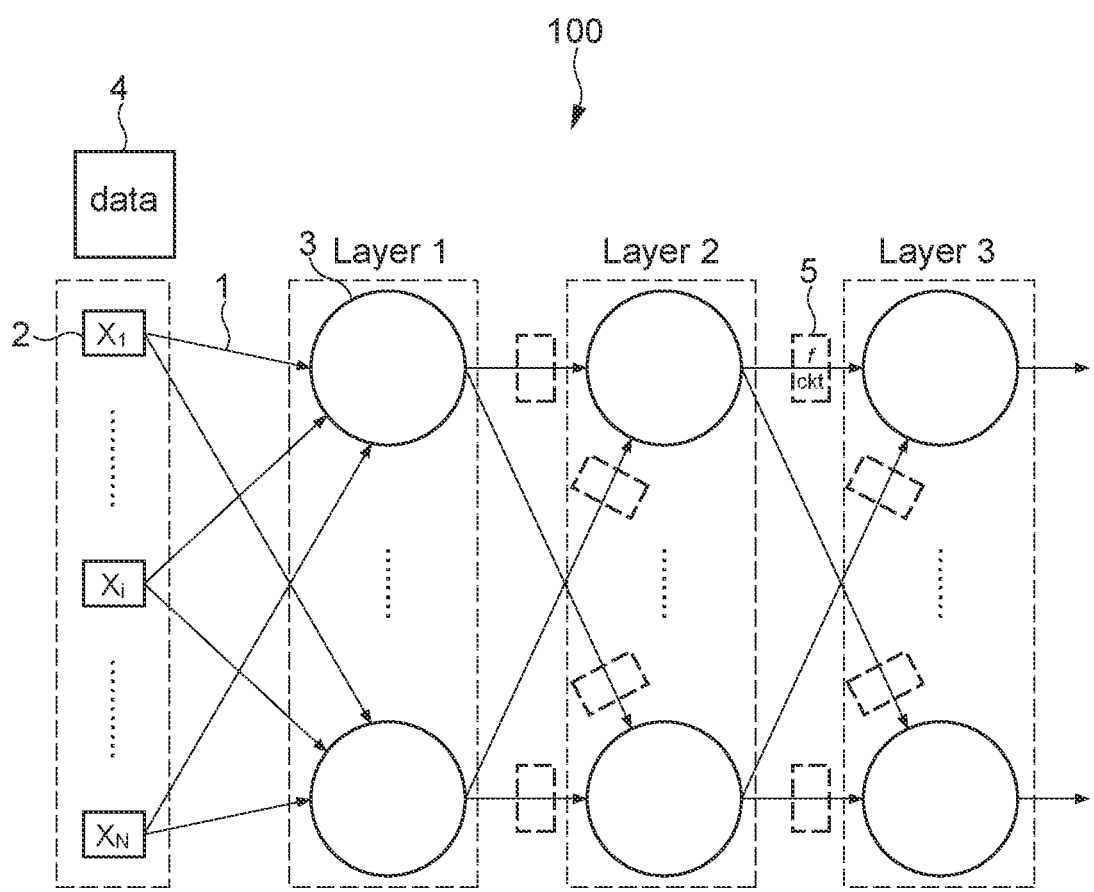
FIG. 1 A schematic diagram showing a configuration example of an arithmetic apparatus according to an embodiment of the present technology.

FIG. 1 is a schematic diagram showing a configuration example of an arithmetic apparatus according an embodiment of the present technology. An arithmetic apparatus 100 is an analog-type arithmetic apparatus that performs predetermined arithmetic processing including a multiply-accumulate operation. By using the arithmetic apparatus 100, for example, it is possible to perform arithmetic processing according to a mathematical model such as a neural network.

The arithmetic apparatus 100 includes a plurality of signal lines 1, a plurality of input units 2, and a plurality of analog circuits 3. Each of the signal lines 1 is a line that transmits a predetermined type of electrical signal. For example, an analog signal representing a signal value by using an analog amount such as a pulse timing and a pulse width is used as the electrical signal. The directions in which electrical signals are transmitted are schematically shown in FIG. 1 by means of arrows. In this embodiment, the analog circuits 3 corresponds to multiply-accumulate devices.

For example, the plurality of signal lines 1 is connected to one analog circuit 3. The signal line 1 that transmits an electrical signal to the analog circuit 3 is an input signal line, into which an electrical signal is input, for the analog circuit 3 to which that signal line 1 is connected. Moreover, the signal line 1 that transmits an electrical signal output from the analog circuit 3 is an output signal line, from which an electrical signal is output, for the analog circuit 3 to which that signal line 1 is connected. In this embodiment, the input signal line corresponds to an input line.

The plurality of input units 2 each generates a plurality of electrical signals corresponding to input data 4. The input data 4 is, for example, data to be processed using a neural network or the like implemented by the arithmetic apparatus 100. Therefore, it can also be said that the respective signal values of the plurality of electrical signals corresponding to the input data 4 are input values to the arithmetic apparatus 100.

For example, arbitrary data such as image data, audio data, and statistical data to be processed by the arithmetic apparatus 100 is used as the input data 4. For example, in a case where image data is used as the input data 4, an electrical signal using a pixel value (RGB value, luminance value, etc.) of each of pixels of the image data as a signal value is generated. In addition, an electrical signal corresponding to the input data 4 may be generated as appropriate in accordance with the type of the input data 4 and the contents of the processing performed by the arithmetic apparatus 100.

The analog circuit 3 is an analog-type circuit that performs a multiply-accumulate operation on the basis of an input electrical signal. The multiply-accumulate operation is, for example, an operation of adding up a plurality of product values obtained by multiplying a plurality of input values by weight values corresponding to input values. Therefore, it can also be said that the multiply-accumulate operation is processing of calculating a sum of the product values (hereinafter, referred to as a multiply-accumulate result).

As shown in FIG. 1, a plurality of input signal lines is connected to one analog circuit 3 and a plurality of electrical signals is provided thereto. The plurality of input signal lines and the analog circuit constitute a multiply-accumulate operation circuit according to this embodiment. Moreover, a plurality of electrical signals is input from each of the input signal lines, and a multiply-accumulate method according to this embodiment is accordingly performed by the multiply-accumulate operation circuit (analog circuit 3).

Hereinafter, it is assumed that the total number of electrical signals input into one analog circuit 3 is N. It should be noted that the number N of electrical signals to be input into each analog circuit 3 is set as appropriate for each circuit in accordance with, for example, the model, accuracy, and the like of arithmetic processing.

In the analog circuit 3, for example, a $w_i \ast x_i$ is calculated which is a product value of a signal value $x_i$ represented by an electrical signal input from an i-th input signal line and a weight value $w_i$ corresponding to the signal value $x_i$. Here, i represents a natural number equal to or smaller than N (i=1, 2, ..., N). The operation of the product value is performed for each electrical signal (input signal line) and N product values are calculated. A value obtained by adding up the N product values is calculated as a multiply-accumulate result (sum of N product values). Therefore, the multiply-accumulate result calculated by one analog circuit 3 is expressed by the following expression.

$$\sum_{i=1}^{N} w_i \cdot x_i \quad \text{[Formula 1]}$$

The weight value $w_i$ is set, for example, in the range of $-\alpha \leq w_i \leq +\alpha$. Here, $\alpha$ represents an arbitrary real value. Thus, the weight value $w_i$ may include a positive weight value $w_i$, a negative weight value $w_i$, a zero weight value $w_i$, and the like. As described above, by setting the weight value $w_i$ to be in a predetermined range, it is possible to avoid the situation where the multiply-accumulate result diverges.

Moreover, for example, the range in which the weight value $w_i$ is set may be normalized. In this case, the weight value $w_i$ is set to be in a range of $-1 \leq w_i \leq 1$. Accordingly, for example, the maximum value, the minimum value, and the like of the multiply-accumulate result can be adjusted, and the multiply-accumulate operation can be performed with a desired accuracy.

In a neural network or the like, a method called binary connect, which sets the weight value $w_i$ to be either $+\alpha$ or $-\alpha$, can be used. The binary connect is used in various fields such as image recognition using a deep neural network (multi-layer neural network). The use of the binary connect can simplify the setting of the weight value $w_i$ without deteriorating the recognition accuracy and the like. In the binary connect, the positive weight value and the absolute value of the negative weight value are fixed to the same value.

As described above, in the binary connect, the weight value $w_i$ is binarized into a binary value ($\pm\alpha$). Thus, a desired weight value $w_i$ can be easily set by changing the weight value $w_i$ to be positive or negative, for example. Alternatively, the binarized weight value $w_i$ may be normalized and the weight value $w_i$ may be set to ±1. In addition, the setting range, the setting value, and the like of the weight value $w_i$ are not limited, and may be set as appropriate such that desired processing accuracy is realized, for example.

The signal values $x_i$ are, for example, electrical signals output from the input units 2 and multiply-accumulate results output from the analog circuits 3. In this way, it can also be said that the input units 2 and the analog circuits 3 function as signal sources for outputting the signal values $x_i$.

In the example shown in FIG. 1, a single electrical signal (single signal value $x_i$) is output from one signal source (input unit 2, analog circuit 3). Therefore, the same electrical signal is input into each of the plurality of signal lines 1 connected to an output side of the one signal source. Moreover, one signal source and the analog circuit 3 into which the electrical signal output from the signal source is input are connected to each other by a single input signal line.

Therefore, for example, M input signal lines are connected to the analog circuit 3 connected to M signal sources in the arithmetic apparatus 100 shown in FIG. 1. In this case, the total number N of electrical signals input into the analog circuits 3 is N=M. It should be noted that a configuration in which a pair of electrical signals corresponding to positive and negative values (pair of signal values $x_i^+$, $x_i^-$) is output from one signal source is possible.

As shown in FIG. 1, the arithmetic apparatus 100 has a layered structure in which the plurality of analog circuits 3 is provided in each of a plurality of layers. By configuring the layer structure of the analog circuits 3, a multi-layer perceptron-type neural network or the like, for example, is constructed. The number of analog circuits provided in each layer, the number of layers, and the like are designed as appropriate such that desired processing can be performed, for example. Hereinafter, the number of analog circuits 3 provided in a j-th layer will be sometimes referred to as $N_j$.

For example, N electrical signals generated by N input units 2 are input into each analog circuit 3 provided in a layer of a first stage (lowest layer). The analog circuits 3 of the first stage calculate multiply-accumulate results related to the signal values $x_i$ of the input data, and output the calculated multiply-accumulate results to the analog circuits 3 provided in a next layer (second stage) after the non-linear conversion processing.

$N_1$ electrical signals representing the respective multiply-accumulate results calculated in the first stage are input into the respective analog circuits 3 provided in a second layer (upper layer). Therefore, as viewed from the analog circuits 3 of the second stage, the non-linear conversion processing results of the respective multiply-accumulate results calculated in the first stage are the signal values $x_i$ of the electrical signals. The analog circuits 3 of the second stage calculate the multiply-accumulate results of the signal values $x_i$ output from the first stage, and output the calculated multiply-accumulate results to the analog circuits 3 of the upper layer.

In this way, in the arithmetic apparatus 100, the multiply-accumulate results of the analog circuits 3 in the upper layer are calculated on the basis of the multiply-accumulate results calculated by the analog circuits 3 in the lower layer. Such processing is performed multiple times, and the processing results are output from the analog circuits 3 included in the top layer (the layer of the third stage in FIG. 1). Accordingly, for example, processing such as image recognition of determining that the object is a cat on the basis of image data (input data 4) obtained by imaging the cat can be performed.

As described above, a desired network circuit can be configured by connecting the plurality of analog circuits 3 as appropriate. The network circuit functions as a data flow processing system that performs arithmetic processing by, for example, causing signals to pass therethrough. In the network circuit, various processing functions can be realized by setting, for example, a weight value (synapse connection) as appropriate. With this network circuit, the multiply-accumulate system according to this embodiment is constructed.

It should be noted that the method of connecting the analog circuits 3 to each other and the like are not limited, and, for example, the plurality of analog circuits 3 may be connected to each other as appropriate such that desired processing can be performed. For example, the present technology can be applied even in a case where the analog circuits 3 are connected to each other so as to configure another structure different from the layered structure.

In the above description, the configuration in which the multiply-accumulate results calculated in the lower layer are input into the upper layer as they are has been described. The present technology is not limited thereto, and, for example, conversion processing or the like may be performed on the multiply-accumulate results. For example, in the neural network model, processing of, for example, performing non-linear conversion on the multiply-accumulate result of each analog circuit 3 by using an activation function and inputting the conversion results to the upper layer is performed.

In the arithmetic apparatus 100, a function circuit 5 or the like that performs non-linear conversion using an activation function on the electrical signal, for example, is used. The function circuit 5 is, for example, a circuit that is provided between a lower layer and an upper layer and that converts a signal value of an input electrical signal as appropriate and outputs an electrical signal according to the conversion result. The function circuit 5 is provided for each of the signal lines 1, for example. The number of function circuits 5, the arrangement of the function circuits 5, and the like are set as appropriate in accordance with, for example, the mathematical model implemented in the arithmetic apparatus 100.

For example, a ReLU function (ramp function) or the like is used as the activation function. The ReLU function outputs the signal value $x_i$ as it is in a case where the signal value $x_i$ is 0 or more, for example, and outputs 0 otherwise. For example, the function circuit 5 that implements the ReLU function is connected to each of the signal lines 1 as appropriate. Accordingly, it is possible to realize the processing of the arithmetic apparatus 100.

Figure 2:
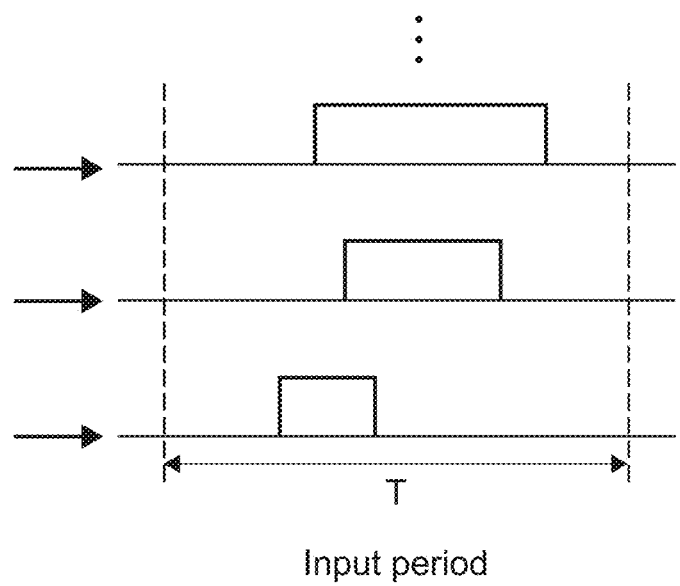
FIG. 2 A schematic diagram showing an example of an electrical signal to be input into an analog circuit.
Figure 2:
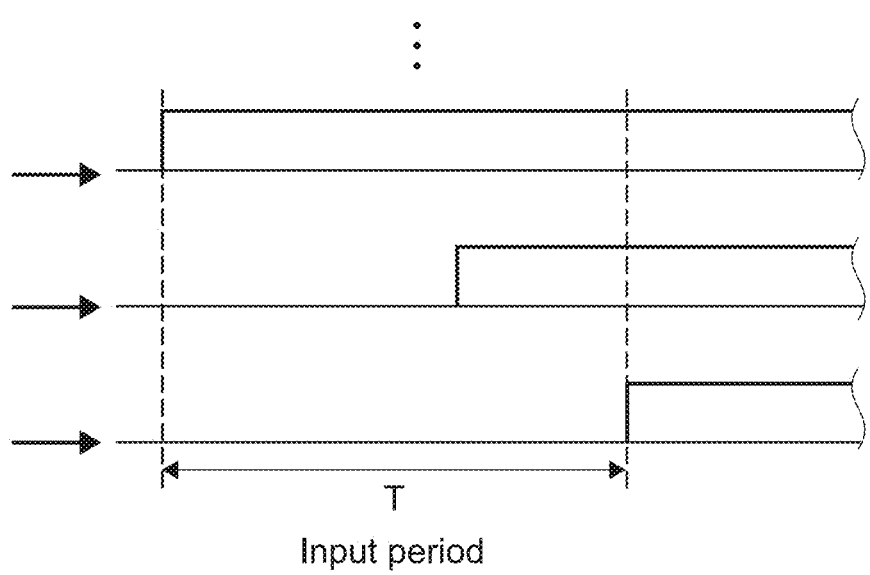

FIG. 2 is a schematic diagram showing an example of the electrical signal input into the analog circuit 3. In each of FIGS. 2A and B, a graph representing a waveform of a plurality of electrical signals is schematically shown. The horizontal axis of the graph indicates the time axis and the vertical axis indicates the voltage of the electrical signal.

An exemplary waveform of an electrical signal according to a pulse width modulation (PWM) method is shown in FIG. 2A. The PWM method is a method of representing a signal value $x_i$ by using a pulse width $\tau_i$ of a pulse waveform, for example. That is, in the PWM method, the pulse width $\tau_i$ of the electrical signal is a length depending on the signal value $x_i$. Typically, the longer the pulse width $\tau_i$, the higher the signal value $x_i$.

Moreover, the electrical signal is input into the analog circuit 3 within a predetermined input period T. More specifically, the respective electrical signals are input into the analog circuits 3 such that the pulse waveforms of the electrical signals fall in the input period T. Therefore, the maximum value of the pulse width of the electrical signal is similar to the input period T. It should be noted that the timing at which each pulse waveform (electrical signal) is input and the like are not limited as long as the pulse waveform falls in the input period T.

In the PWM method, for example, a duty ratio $R_i$ ($=\tau_i/T$) of the pulse width $\tau_i$ to the input period T can be used to normalize the signal value $x_i$. That is, the normalized signal value $x_i$ is represented as the signal value $x_i = R_i$. It should be noted that the method of associating the signal value $x_i$ with the pulse width $\tau_i$ is not limited and, for example, the pulse width $\tau_i$ representing the signal value $x_i$ may be set as appropriate such that the calculation processing or the like can be performed with a desired accuracy.

In a case where the electrical signal according to the PWM method is used, a time-axis analog multiply-accumulate operation using the analog circuit 3 according to the PWM method can be performed.

In FIG. 2B, an exemplary waveform of the electrical signal of a spike timing method (hereinafter, referred to as TACT method) is shown. The TACT method is a method of representing a signal value $x_i$ by using the rising timing of the pulse, for example. For example, a pulse is input at a timing corresponding to the input value by using a predetermined timing as a reference.

The electrical signal is input into the analog circuit 3 within the predetermined input period T. The signal value $x_i$ is represented by the input timing of the pulse within this input period T. For example, a largest signal value $x_i$ is represented by a pulse input at the same time as the start of the input period T. A smallest signal value $x_i$ is represented by a pulse input at the same time as the end of the input period T.

It can also be said that the signal value $x_i$ is represented by the duration from the input timing of the pulse to the end timing of the input period T. For example, the largest signal value $x_i$ is represented by a pulse whose duration from the input timing of the pulse to the end timing of the input period T is equal to the input period T. The smallest signal value $x_i$ is represented by a pulse whose duration from the input timing of the pulse to the end timing of the input period T is 0.

It should be noted that in the FIG. 2B, a continuous pulse signal that rises to a timing corresponding to the input value and keeps the ON level until the multiply-accumulate result is obtained is used as the electrical signal according to the TACT method. The present technology is not limited thereto, and a rectangular pulse or the like having a predetermined pulse width may be used as the electrical signal according to the TACT method.

In a case where the electrical signal according to the TACT method is used, a time-axis analog multiply-accumulate operation using the analog circuit 3 according to the TACT method can be performed.

As illustrated in FIGS. 2A and B, a pulse signal whose duration of the ON time with respect to the input period T corresponds to the input value can be used as the electrical signal corresponding to the input value. It should be noted that hereinafter, the description will be made assuming that the signal value $x_i$ represented by each electrical signal is a variable of 0 or more and 1 or less.

Figure 3:
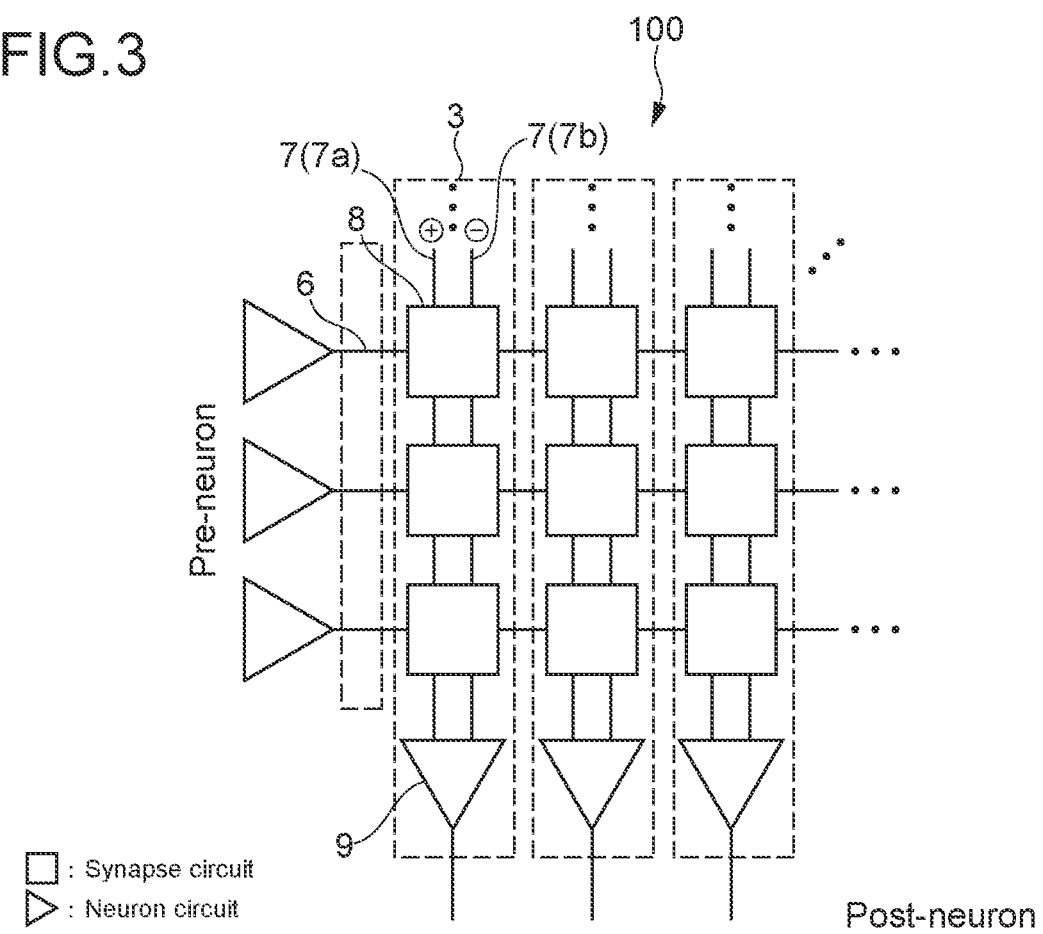
FIG. 3 A schematic diagram showing a specific configuration example of an arithmetic apparatus.

FIG. 3 is a schematic diagram showing a specific configuration example of the arithmetic apparatus 100. FIG. 3 is an arrangement example of circuits for realizing the arithmetic apparatus 100 shown in FIG. 1, for example, and schematically shows the plurality of analog circuits 3 provided in one layer of the arithmetic apparatus 100.

The analog circuits 3 each include a pair of output lines 7, a plurality of synapse circuits 8, and a neuron circuit 9. As shown in FIG. 3, one analog circuit 3 is configured to extend in a predetermined direction (vertical direction in the figure). A plurality of such analog circuits 3 extending in the vertical direction are arranged side by side in the horizontal direction, to thereby form one layer. Hereinafter, it is assumed that the analog circuit 3 disposed on the leftmost side in the figure is a first analog circuit 3. Moreover, the direction in which the analog circuits 3 extend will be sometimes referred to as an extension direction.

The pair of output lines 7 is spaced apart from each other along the extension direction. The pair of output lines 7 includes a positive charge output line 7a and a negative charge output line 7b. Each of the positive charge output line 7a and the negative charge output line 7b is connected to the neuron circuit 9 via the plurality of synapse circuits 8.

The synapse circuit 8 calculates a product value ($w_i * x_i$) of the signal value $x_i$ represented by the electrical signal and the weight value $w_i$. Specifically, a charge (current) corresponding to the product value is output to either the positive charge output line 7a or the negative charge output line 7b.

As will be described later, either the positive weight value $w_i^+$ or the negative weight value $w_i^-$ is set to the synapse circuit 8. For example, a positive weight charge corresponding to the product value of the positive weight value $w_i^+$ is output to the positive charge output line 7a. Moreover, for example, a negative weight charge corresponding to the product value of the negative weight value $w_i^-$ is output to the negative charge output line 7b.

It should be noted that in the synapse circuit 8, a charge with the same sign (e.g., a positive charge) is output as the charge corresponding to the product value irrespective of whether the weight value $w_i$ is positive or negative. That is, the positive weight charge and the negative weight charge become charges with the same sign.

In this way, the synapse circuits 8 are each configured to output the charge corresponding to the multiplication result to the different output line 7a or 7b in accordance with the sign of the weight value $w_i$. A specific configuration of the synapse circuit 8 will be described later in detail. In this embodiment, the plurality of synapse circuits 8 functions as a plurality of multiplication units that each generates a charge corresponding to a product value obtained by multiplying an input value by a weight value on the basis of an electrical signal input into each of the plurality of input lines.

In this embodiment, the single input signal line 6 and the pair of output lines 7 are connected to the single synapse circuit 8. That is, a single electrical signal is input into the single synapse circuit 8 and a charge corresponding to the product value calculated on the basis of the input electrical signal is output to either the output line 7a or 7b. Thus, the synapse circuit 8 is a one-input two-output circuit connected to the single input signal line 6 and the pair of output lines 7 (positive charge output line 7a and the negative charge output line 7b).

In one analog circuit 3, the plurality of synapse circuits 8 is arranged along the pair of output lines 7. Each synapse circuits 8 is connected in parallel to the positive charge output line 7a (negative charge output line 7b). Hereinafter, it is assumed that the synapse circuit 8 disposed on a most downstream side (side connected to the neuron circuit 9) is a first synapse circuit.

As shown in FIG. 3, the plurality of input signal lines 6 is wired so as to intersect with the pair of output lines 7 of each of the plurality of analog circuits 3. Typically, the input signal line 6 is provided to be orthogonal to each output line 7. That is, the arithmetic apparatus 100 has a crossbar configuration in which the input signal lines 6 and the output lines 7 cross each other. With the crossbar configuration, the analog circuits 3 and the like, for example, can be integrated at high density.

Moreover, in the arithmetic apparatus 100, j-th synapse circuits 8 included in the respective analog circuits 3 are connected in parallel to a j-th input signal line 6. Therefore, similar electrical signals are input into the synapse circuits 8 connected to the same input signal line 6. Accordingly, a configuration in which one signal source included in the lower layer is connected to a plurality of analog circuits 3 included in the upper layer can be implemented.

It should be noted that in the example shown in FIG. 3, the analog circuit 3 (pre-neuron) included in the lower layer is schematically shown as a signal source that inputs an electrical signal into each of the input signal lines 6. The present technology is not limited thereto, and, for example, the crossbar configuration can be used also in a case where the input unit 2 is used as the signal source.

As described above, in the arithmetic apparatus 100, the plurality of analog circuits 3 is connected in parallel to each of the plurality of input signal lines 6. Accordingly, for example, it is possible to input an electrical signal in parallel into each analog circuit 3 (each synapse circuit 8) and to achieve arithmetic processing at high speed. As a result, it is possible to exhibit excellent operation performance.

The neuron circuit 9 calculates a multiply-accumulate result shown in the expression (Formula 1) on the basis of the product values calculated by the synapse circuits 8. Specifically, the neuron circuit 9 outputs an electrical signal representing the multiply-accumulate result (multiply-accumulate signal) on the basis of charges input via the pair of output lines 7.

Figure 4:
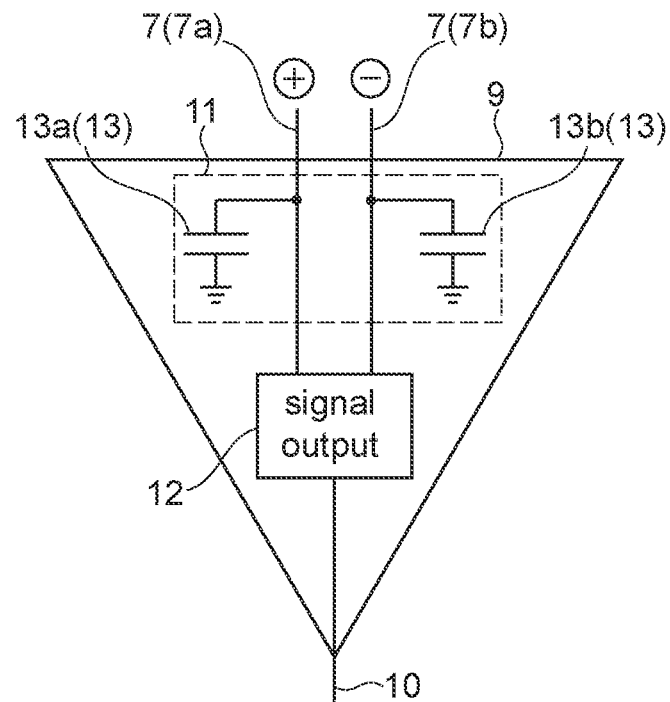
FIG. 4 A schematic diagram showing a configuration example of a neuron circuit.

FIG. 4 is a schematic diagram showing a configuration example of the neuron circuit 9. The neuron circuit 9 includes an accumulation unit 11 and a signal output unit 12. FIG. 4 shows a two-input one-output neuron circuit 9 connected to a pair of output lines 7 and a single output signal line 10. It should be noted that a two-input two-output circuit or the like can be used as the neuron circuit 9 in some cases.

The accumulation unit 11 accumulates charges output to the pair of output lines 7 by the plurality of synapse circuits 8. The accumulation unit 11 includes two capacitors 13a and 13b. The capacitor 13a is connected between the positive charge output line 7a and the GND. Moreover, the capacitor 13b is connected between the negative charge output line 7b and the GND. Therefore, charges flowing in from the positive charge output line 7a and the negative charge output line 7b are respectively accumulated in the capacitors 13a and 13b.

For example, when the input period T of the electrical signal has elapsed, the charges accumulated in the capacitor 13a are a sum total $\sigma^+$ of positive weight charges each corresponding to the product value of the positive weight value $w_i^+$. Also, the charges accumulated in the capacitor 13b are a sum total $\sigma^-$ of negative weight charges corresponding to the product value of the negative weight value $w_i^-$.

For example, in a case where the positive weight charges are accumulated in the capacitor 13a, the potential of the positive charge output line 7a with reference to the GND increases. Therefore, the potential of the positive charge output line 7a is a value depending on the sum total $\sigma^+$ of the charges each corresponding to the product value of the positive weight value $w_i^+$. It should be noted that the potential of the positive charge output line 7a corresponds to the voltage retained by the capacitor 13a.

Similarly, in a case where the negative weight charges are accumulated in the capacitor 13b, the potential of the negative charge output line 7b with reference to the GND increases. Therefore, the potential of the negative charge output line 7b is a value depending on the sum total $\sigma^-$ of the charges each corresponding to the product value of the negative weight value $w_i^-$. It should be noted that the potential of the negative charge output line 7b corresponds to the voltage retained by the capacitor 13b.

The signal output unit 12 outputs a multiply-accumulate signal representing a sum of the product values ($w_i^{+*}x_i$) on the basis of the charges accumulated in the accumulation unit 11. The multiply-accumulate signal is, for example, a signal representing a total multiply-accumulate result, which is a sum of product values of all positive and negative weight values $w_i$ and signal values $x_i$. For example, the multiply-accumulate result represented by the expression (Formula 1) can be written as follows.

$$\sum_{i=1}^{N} w_i x_i = \sum_{i=1}^{N^+} w_i^+ x_i - \sum_{i=1}^{N^-} |w_i^-| x_i \qquad \text{[Formula 2]}$$

Here, $N^+$ and $N^-$ are the total number of positive weight values $w_i^+$ and the total number of negative weight values $w_i^-$, respectively. As shown in the expression (Formula 2), the total multiply-accumulate result can be calculated as a difference between a multiply-accumulate result of positive weight charges, which is a sum total of product values ($w_i^{+*}x_i$) of the positive weight values $w_i^+$, and a multiply-accumulate result of negative weight charges, which is a sum total of product values ($|w_i^-|*x_i$) of the negative weight values $w_i^-$.

In the example shown in FIG. 4, the signal output unit 12 generates one signal representing the total multiply-accumulate result, for example, as the multiply-accumulate signal. Specifically, by referring to the charges accumulated in the accumulation unit 11 (capacitors 13a and 13b) as appropriate, a positive multiply-accumulate result and a negative multiply-accumulate result are calculated, and the total multiply-accumulate result is calculated on the basis of the difference therebetween. Moreover, for example, two signals of a positive multiply-accumulate signal and a negative multiply-accumulate signal respectively representing the positive and negative multiply-accumulate results may be generated as the multiply-accumulate signals.

The method of referring to the charges accumulated in the accumulation unit 11 is not limited. As an example, a method of detecting charges accumulated in one capacitor 13 will be described. In a case where the electrical signal according to the PWM method illustrated in FIG. 2A is used, the charges each corresponding to the product value are accumulated in the capacitor 13 within the input period T. That is, the accumulation of charges each corresponding to the product value does not occur before and after the input period T.

For example, after the input period T ends, the capacitor 13 is charged at a predetermined charging speed. At this time, a comparator or the like is used to detect a timing at which the potential of the output line to which the capacitor 13 is connected reaches a predetermined threshold potential. For example, as more charges are accumulated at the time of starting charging, the timing at which the potential reaches the threshold potential becomes earlier. Therefore, the charges (multiply-accumulate result) accumulated within the input period T can be represented on the basis of the timing. It should be noted that the charging speed can be expressed by, for example, a charge amount per unit time, and can also be referred to as a charging rate.

It should be noted that this threshold determination corresponds to increasing the voltage retained by the capacitor 13 by charging and detecting the timing at which the threshold voltage is reached.

In a case where the electrical signal according to the TACT method illustrated in FIG. 2B is used, charges are accumulated in the capacitor 13 because the ON level is maintained also after the input period T ends. For this charge accumulation, the timing at which the potential of the output line to which the capacitor 13 is connected reaches the predetermined threshold potential is detected by using the comparator or the like. For example, as more charges are accumulated at the end of input period T, the timing at which the potential reaches the threshold potential becomes earlier. Therefore, the charges (multiply-accumulate result) accumulated within the input period T can be represented on the basis of the timing.

It should be noted that this threshold determination corresponds to detecting the timing at which the voltage retained by the capacitor 13 reaches the threshold voltage.

For example, by performing such threshold determination, a timing to represent the multiply-accumulate result is detected. The multiply-accumulate signal of positive weight charges, the multiply-accumulate signal of negative weight charges, or the total multiply-accumulate signal is generated as appropriate on the basis of the detection result. In addition, each multiply-accumulate result may be calculated by directly reading the potential of the capacitor 13 when the input period T ends, for example.

It should be noted that the voltage depending on the accumulated positive weight charges and the voltage depending on the accumulated negative weight charges may be each amplified in order to generate the multiply-accumulate signal. Moreover, the multiply-accumulate signal may be generated by amplifying the differential voltage between the voltage depending on the accumulated positive weight charges and the voltage depending on the accumulated negative weight charges. For example, a differential amplifier or the like having an arbitrary configuration may be provided in the neuron circuit 9.

In this embodiment, the neuron circuit 9 functions as an output unit that accumulates charges corresponding to the product values generated by the plurality of multiplication units and outputs a multiply-accumulate signal representing a sum of the product values on the basis of the accumulated charges. Moreover, the capacitor 13a and the capacitor 13b functions as a positive charge accumulation unit and a negative charge accumulation unit. The neuron circuit 9 accumulates at least one of a positive weight charge generated by a positive weight multiplication unit and a negative weight charge generated by a negative weight multiplication unit, to thereby output a multiply-accumulate signal.

[Analog Circuit According to PWM Method]

Figure 5:
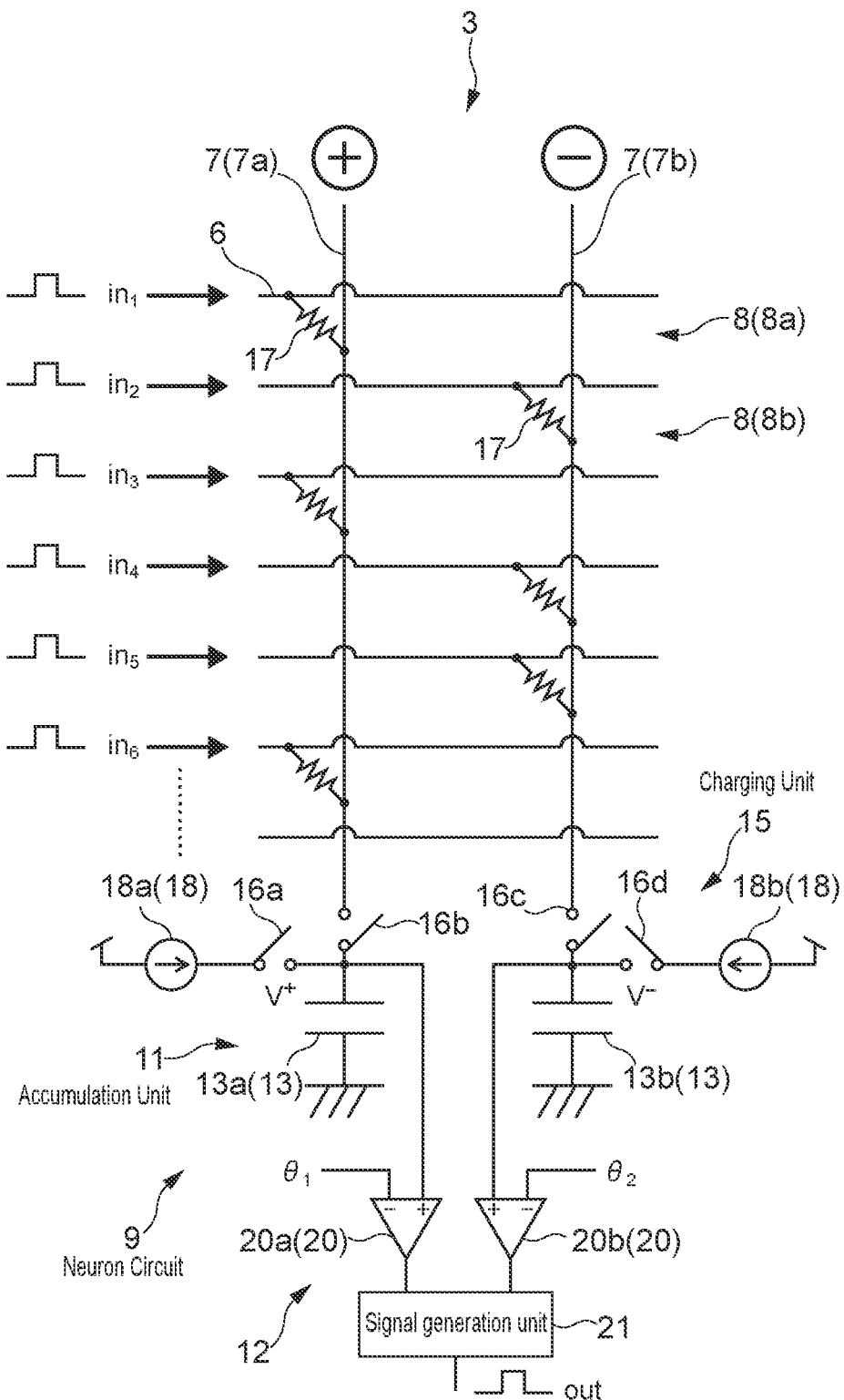
FIG. 5 A schematic circuit diagram showing an example of an analog circuit of a PWM method.

FIG. 5 is a schematic circuit diagram showing an example of the analog circuit according to this embodiment. In FIG. 5, an example of the analog circuit 3 according to the PWM method is shown. The analog circuit 3 is provided extending in a direction orthogonal to the plurality of input signal lines 6. That is, in the example shown in FIG. 5, the crossbar configuration is employed.

The analog circuit 3 includes the pair of output lines (positive charge output line 7a and negative charge output line 7b), a plurality of synapse circuits (plurality of multiplication units) 8, and a neuron circuit 9. In the example shown in FIG. 5, the neuron circuit 9 includes the accumulation unit 11, a charging unit 15, a signal output unit 12, and switches 16a to 16d.

Pulse signals (PWM signals) each having a pulse width corresponding to the signal value $x_i$ are input into the plurality of input signal lines 6 as input signals $in_1$ to $in_6$. In the example shown in FIG. 5, six input signal lines 6 are shown, though the number of input signal lines 6 is not limited. The input signals $in_1$ to $in_6$ are input within the input period T having a predetermined duration (see FIG. 6).

The positive charge output line 7a outputs the positive weight charges corresponding to the product values ($w_i^+ * x_i$) each obtained by multiplying the signal value $x_i$ by the positive weight value $w_i^+$. The negative charge output line 7b outputs the negative weight charges corresponding to the product values ($|w_i^-|*x_i$) each obtained by multiplying the signal value $x_i$ by the negative weight value $w_i^-$. In this embodiment, the pair of output lines 7 corresponds to one or more output lines.

The plurality of synapse circuits 8 is provided to be associated with the plurality of input signal lines 6, respectively. In this embodiment, one synapse circuit 8 is provided in one input signal line 6. Each of the plurality of synapse circuits 8 includes a resistor 17 that is connected between the corresponding input signal line 6 of the plurality of input signal lines 6 and any one of the positive charge output line 7a or the negative charge output line 7b. This resistor 17 may have a non-linear characteristic and may have a function of preventing backflow of current. A charge corresponding to the product value ($w_i^+ * x_i$) (or ($|w_i^-|*x_i$)) is output to the output line 7a (or 7b) to which the resistor 17 is connected.

For example, in order to multiply the signal value $x_i$ by the positive weight value $w_i^+$ in each synapse circuit 8, the resistor 17 is connected between the input signal line 6 and the positive charge output line 7a and the positive charge output line 7a is made to output a positive weight charge. In the example shown in FIG. 5, the synapse circuit 8 into which the input signal $in_1$, $in_3$, $in_6$ is input is a synapse circuit 8a configured as the positive weight multiplication unit that generates a positive weight charge. It can also be said that the synapse circuit 8a is a multiplication unit in which a positive weight is set.

In order to multiply the signal value $x_i$ by the negative weight value $w_i^-$ in each synapse circuit 8, the resistor 17 is connected between the input signal line 6 and the negative charge output line 7b and the negative charge output line 7b is made to output a negative weight charge. In the example shown in FIG. 5, the synapse circuit 8 into which the input signal $in_2$, $in_4$, $in_5$ is input is a synapse circuit 8b configured as the negative weight multiplication unit that generates a negative weight charge. It can also be said that the synapse circuit 8b is a multiplication unit in which a negative weight is set.

It should be noted that a resistor having a resistance value corresponding to the weight value $w_i$ to be set is used as the resistor 17. That is, the resistor 17 functions as an element that defines the weight value $w_i$ in the arithmetic apparatus 100 that performs multiply-accumulate operations at the analog circuits 3.

For example, a fixed resistor element, a variable resistor element, a MOS transistor that operates in a sub-threshold region, or the like is used as the resistor 17. By using a MOS transistor that operates in the sub-threshold region as the resistor 17, for example, it is possible to reduce the power consumption. As a matter of course, another arbitrary resistor may be used.

The accumulation unit 11 accumulates charges corresponding to the product values ($w_i*x_i$) generated by the plurality of synapse circuits 8. In this embodiment, two capacitors 13a and 13b are provided as the accumulation unit 11.

The capacitor 13a is connected to the positive charge output line 7a via a switch 16b to accumulate the positive weight charges generated by the synapse circuits 8a. The capacitor 13b is connected to the negative charge output line 7b via a switch 16c to accumulate the negative weight charges generated by the synapse circuits 8b.

The charging unit 15 charges the accumulation unit 11 in which a sum of charges corresponding to the product values ($w_i*x_i$) is accumulated at the predetermined charging speed. In this embodiment, two current sources 18a and 18b are provided as the charging unit 15. It should be noted that the charging is performed after the input period T ends.

The current source 18a is connected to a side (side opposite to the GND) of the capacitor 13a, which is connected to the positive charge output line 7a, via the switch 16a. The current source 18b is connected to a side (side opposite to the GND) of the capacitor 13b, which is connected to the negative charge output line 7b, via the switch 16d.

In this embodiment, the current sources 18a and 18b charge the capacitors 13a and 13b at the same charging speed. Accordingly, the potential $V^+$ of the positive charge output line 7a (the voltage retained by the capacitor 13a) and the potential $V^-$ of the negative charge output line 7b (the voltage retained by the capacitor 13b) are each increased. The specific configuration of the current source 18 is not limited and may be arbitrarily designed.

After the charging unit 15 starts charging, the signal output unit 12 performs threshold determination on the voltage retained by the accumulation unit 11 on the basis of a predetermined threshold value, to thereby output a multiply-accumulate signal representing a sum of the product values ($w_i*x_i$). In this embodiment, two comparators 20a and 20b and a signal generation unit 21 are provided as the signal output unit 12.

The comparator 20a detects a timing at which the voltage retained by the capacitor 13a exceeds a predetermined threshold value θ1. It should be noted that the magnitude of the voltage retained by the capacitor 13a is determined by the total amount of positive weight charge accumulated in the capacitor 13a and the charge amount (charging speed× time).

The comparator 20b detects a timing at which the voltage retained by the capacitor 13b exceeds a predetermined threshold value θ2. It should be noted that the magnitude of the voltage retained by the capacitor 13b is determined by the total amount of negative weight charge accumulated in the capacitor 13b and the charge amount (charging speed× time).

It should be noted that in this embodiment, a multiply-accumulate signal is output by performing threshold determination on each of the capacitors 13a and 13b with the same threshold value. That is, the threshold value θ1=the threshold value θ2 is set.

The signal generation unit 21 outputs a multiply-accumulate signal representing a sum of the product values ($w_i*x_i$) on the basis of the timing detected by the comparator 20a and the timing detected by the comparator 20b. In other words, the signal generation unit 21 outputs a multiply-accumulate signal on the basis of a timing at which the voltage retained by the capacitor 13a reaches the threshold value θ1 and a timing at which the voltage retained by the capacitor 13b reaches the threshold value θ2 (=θ1).

In this embodiment, a PMW signal, which is a pulse signal the pulse width of which has been modulated, is output as the multiply-accumulate signal. The specific circuit configuration and the like of the signal generation unit 21 are not limited and may be arbitrarily designed.

Figure 6:
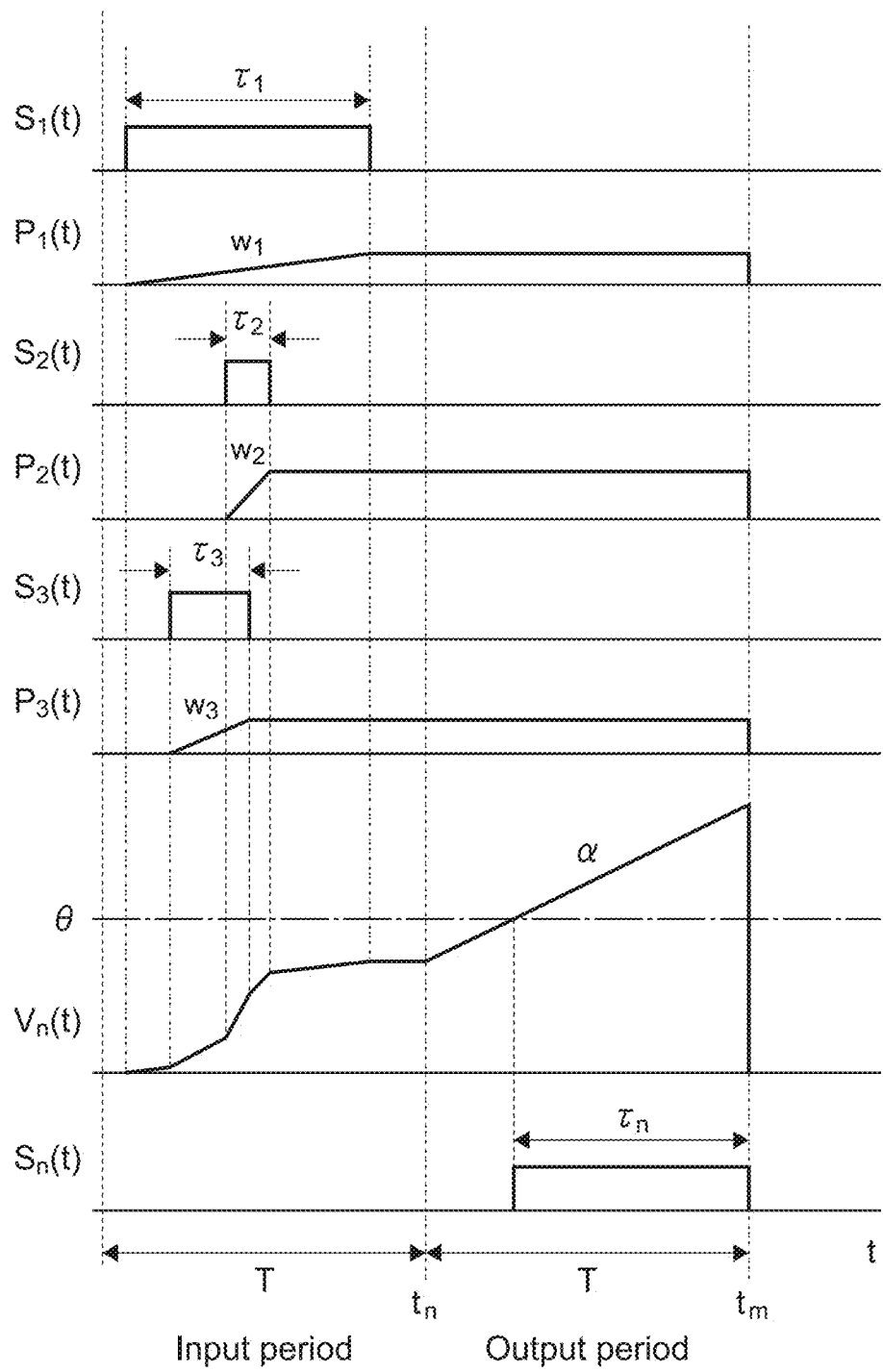
FIG. 6 A diagram for describing a calculation example of a multiply-accumulate signal by the analog circuit shown in FIG. 5.
Figure 7:
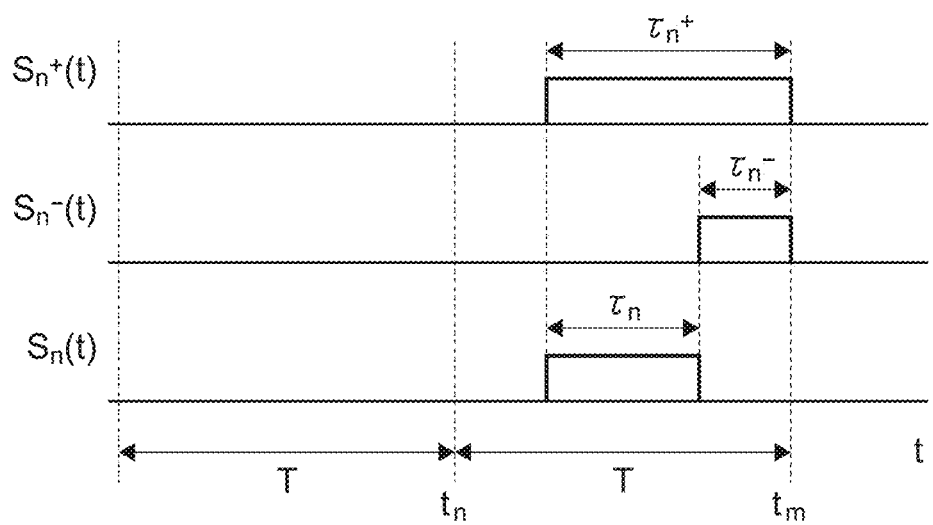
FIG. 7 A schematic diagram showing a calculation example of a multiply-accumulate signal showing the entire multiply-accumulate result.

FIGS. 6 and 7 are diagrams for describing a calculation example of the multiply-accumulate signal by the analog circuit 3 shown in FIG. 5. In this embodiment, a signal representing the total multiply-accumulate result including the positive and negative values is calculated on the basis of the multiply-accumulate result of positive weight charges based on the positive weight charges accumulated in the capacitor 13a and the multiply-accumulate result of negative weight charges based on the negative weight charges accumulated in the capacitor 13b.

The calculation of the multiply-accumulate result of the positive weight charges and the calculation of the multiply-accumulate result of the negative weight charges are the same processing. First, a method (multiply-accumulate method) of calculating the multiply-accumulate result on the basis of the charges accumulated in the capacitor 13 without discrimination between positive and negative values will be described with reference to FIG. 6.

The parameters described in FIG. 6 will be described. "t" represents time. "T" represents each of the input period and the output period. "$t_n$" represents an end timing of the input period T and "$t_m$" represents an end timing of the output period T.

In this embodiment, the duration of the input period T and the duration of the output period T are set to be equal to each other. Moreover, the output period T is started from an end timing $t_n$ of the input period T. Therefore, the end timing $t_n$ of the input period T corresponds to the start timing of the output period T.

"θ" represents a threshold value used for threshold determination performed by the signal output unit 12 (comparator 20).

"$S_i(t)$" represents an input signal (PWM signal) input into an i-th input signal line 6. "$\tau_i$" represents the pulse width of the input signal $S_i(t)$. "$P_i(t)$" represents an amount of change of an internal state (potential) in each synapse circuit 8 shown in FIG. 5. "$w_i$" represents a weight value and is defined by the resistance value of the resistor 17 shown in FIG. 5.

"$V_n(t)$" represents a sum total of "$P_i(t)$" and corresponds to the total amount of charge accumulated in the capacitor 13. "$S_n(t)$" represents a multiply-accumulate signal (PWM signal) representing the multiply-accumulate result. "$\tau_n$" represents the pulse width of the multiply-accumulate signal to be output. Specifically, "$\tau_n$" represents a value corresponding to the duration from the timing at which the voltage retained by the capacitor 13 exceeds the threshold value θ in the output period T to the end timing $t_m$ of the output period T.

In this example, the switches 16b and 16c are provided, and, in particular, it is possible to reduce the power consumption and improve the charging accuracy by disconnecting the output line through this switch.

Here, as shown in the following expression, the input value (signal value) $x_i$ is given by the duty ratio $R_i$ (=τ/T) of the pulse width $τ_i$ of the input signal $S_i(t)$ to the input period T.

$$x_i = R_i\left( = \frac{\tau_i}{T}\right) \quad \text{[Formula 3]}$$

The synapse circuit 8 shown in FIG. 5 generates the charge corresponding to the product value obtained by multiplying the signal value $x_i$ by the weight value $w_i$. Specifically, the resistance of the resistor 17 increases the internal state (potential) at a constant slope $w_i$.

The amount of change $P_i(t_n)$ of the internal potential of each synapse circuit 8 at the end timing $t_n$ of the input period T is given by the following expression. It should be noted that the high-level value of the input-signal $S_i(t)$ is set to 1.

$$P_i(t_n) = w_i R_i T = w_i x_i T \quad \text{[Formula 4]}$$

The total amount $V_n(t_n)$ of charge accumulated in the capacitor 13 is a sum total of $Pi(t_n)$, and thus it is given by the following expression.

$$V_n(t_n) = \sum_{i=1}^{N} P_i(t_n) = T\sum_{i=1}^{N} w_i x_i \quad \text{[Formula 5]}$$

At the end timing $t_n$ of the input period T, the switches 16a and 16d shown in FIG. 5 are turned on and the switches 16b and 16c are turned off. Charging by the charging unit 15 (current source 18) is started at the end timing $t_n$ of the input period T. Therefore, in this embodiment, the output period T is started at the start timing of charging by the charging unit 15. That is, the charging and the output period are started simultaneously at the end timing $t_n$ of the input period T.

The current source 18 increases the internal potential of each synapse circuit 8 at a slope (charging speed) α from the end timing $t_n$ of the input period T. A multiply-accumulate signal (PWM signal) having a pulse width $τ_n$ corresponding to the duration from the timing at which the voltage retained by the capacitor 13 exceeds the threshold value θ in the output period T to the end timing $t_m$ of the output period T is generated.

Assuming that the duty ratio of the pulse width $τ_n$ of the multiply-accumulate signal to the output period T is $R_n$ (=$τ_n$/T), $R_n$ is given by the following expression. It should be noted that the threshold value θ is equal to or larger than the total amount $V_n(t_n)$ of charge.

$$R_n = \frac{T - \frac{(\theta - V_n(t_n))}{\alpha}}{T} = \frac{1}{\alpha}\sum_{i=1}^{N} w_i x_i + \frac{(\alpha T - \theta)}{\alpha T} \quad \text{[Formula 6]}$$

Therefore, the multiply-accumulate result obtained by adding up product values ($w_i * x_i$) each obtained by multiplying the signal value $x_i$ by the weight value $w_i$ is given by the following expression.

$$\sum_{i=1}^{N} w_i x_i = \alpha R_n - \frac{(\alpha T - \theta)}{T} \quad \text{[Formula 7]}$$

That is, the multiply-accumulate result is a value obtained by subtracting the constant defined by the charging speed α, the threshold value θ, and the output period T from $\alpha R_n = \alpha \cdot (τ_n/T)$. In this way, the multiply-accumulate signal representing the multiply-accumulate result can be output on the basis of the timing at which the voltage retained by the accumulation unit 11 exceeds the threshold value θ in the output period T having the predetermined duration.

FIG. 7 is a schematic diagram showing a calculation example of a multiply-accumulate signal representing a total multiply-accumulate result based on the multiply-accumulate results of both the positive weight charges and the negative weight charges. In FIG. 7, the multiply-accumulate signal representing the multiply-accumulate result of the positive weight charges is denoted by "$S_n^+(t)$" and its pulse width is denoted by "$τ_n^+$". Moreover, the multiply-accumulate signal representing the multiply-accumulate result of the negative weight charges is denoted by "$S_n^-(t)$" and its pulse width is denoted by "$τ_n^-$". Moreover, the multiply-accumulate signal representing the total multiply-accumulate result is denoted by "$S_n(t)$" and its pulse width is denoted by "$τ_n$".

The total amount $V_n^+(t_n)$ of positive weight charge accumulated in the capacitor 13a at the end timing $t_n$ of the input period T is given by the following expression. It should be noted that $w_i^+$ represents a positive weight value.

$$V_n^+(t_n) = T\sum_{i=1}^{N^+} w_i^+ x_i \quad \text{[Formula 8]}$$

The total amount $V_n^-(t_n)$ of the negative weight charge accumulated in the capacitor 13b at the end timing $t_n$ of the input period T is given by the following expression. It should be noted that $w_i^-$ represents a negative weight value.

$$V_n^-(t_n) = T\sum_{i=1}^{N^-} |w_i^-| x_i \quad \text{[Formula 9]}$$

Assuming that the duty ratio of the positive multiply-accumulate signal $S_n^+(t)$ is $R_n^+(=τ_n^+/T)$, the positive multiply-accumulate result obtained by adding up product values ($w_i^+ * x_i$) obtained by multiplying the signal value $x_i$ by the positive weight value $w_i^+$ is given by the following expression. It should be noted that it is assumed that the threshold value θ is equal to or larger than the total amount $V_n^+(t_n)$ of positive weight charge.

$$\sum_{i=1}^{N^+} w_i^+ x_i = \alpha R_n^+ - \frac{(\alpha T - \theta)}{T} \quad \text{[Formula 10]}$$

In a case where the duty ratio of the negative multiply-accumulate signal $S_n^-(t)$ is $R_n^-$ ($=\tau_n^-/T$), a negative multiply-accumulate result obtained by adding up product values ($|w_i^-|*x_i$) obtained by multiplying the input value $x_i$ by the negative weight value $w_i^-$ is given by the following expression. It should be noted that the charge speed α and the threshold value θ are equal to the values used in the expression (Formula 10). Moreover, it is assumed that the threshold value θ is equal to or larger than the total amount $V_n^-(t_n)$ of negative weight charge.

$$\sum_{i=1}^{N^-} |w_i^-| x_i = \alpha R_n^- - \frac{(\alpha T - \theta)}{T} \qquad \text{[Formula 11]}$$

Therefore, with the expression (Formula 2) described above, the total multiply-accumulate result is given by the following expression.

$$\sum_{i=1}^{N} w_i x_i = \alpha(R_n^+ - R_n^-)\left(= \alpha \frac{\tau_n^+ - \tau_n^+}{T}\right) \qquad \text{[Formula 12]}$$

That is, the total multiply-accumulate result is obtained by the charge speed α, the pulse width $\tau_i^+$ of the multiply-accumulate signal $S_n^+(t)$, the pulse width $\tau_i^-$ of the multiply-accumulate signal $S_n^-(t)$, and the output period T. That is, it is possible to easily calculate the multiply-accumulate result on the basis of the timing detected by the comparator 20a and the timing detected by the comparator 20b.

As shown in FIG. 7, it is possible to easily output the multiply-accumulate signal "$S_n(t)$" having the pulse width "$\tau_n$" as the multiply-accumulate signal representing the total multiply-accumulate result. It should be noted that it may be possible to determine which one of the pulse width $\tau_n^+$ of the multiply-accumulate signal $S_n^+(t)$ and the pulse width $\tau_n^-$ of the multiply-accumulate signal $S_n^-(t)$ is larger. The multiply-accumulate signal "$S_n(t)$" in a case where the pulse width $\tau_n^+$ is larger can be output as the positive multiply-accumulate signal and the multiply-accumulate signal "$S_n(t)$" in a case where the pulse width $\tau_n^-$ is larger can also be output as the negative multiply-accumulate signal. A circuit for comparing the pulse width $\tau_n^+$ with the pulse width $\tau_n^-$ can be realized by using an AND circuit, a NOT circuit, and the like as appropriate.

A setting can also be made such that in a case where the ReLU function (ramp function) or the like is used, for example, when the positive multiply-accumulate signal "$S_n(t)$" is obtained, the signal is output as it is, and when the negative multiply-accumulate signal "$S_n(t)$" is obtained, 0 is output.

As the setting of the charging speed α and the threshold value θ, α=θ/T is set for the output period T. Accordingly, the constant determined by the charge speed α, the threshold value θ, and the output period T included in the expressions (Formula 6), (Formula 7), (Formula 10), and (Formula 11) can be set to be zero, and the processing can be simplified. That is, by setting the threshold value θ on the basis of the duration of the input period T, an advantageous effect can be exhibited.

Figure 8:
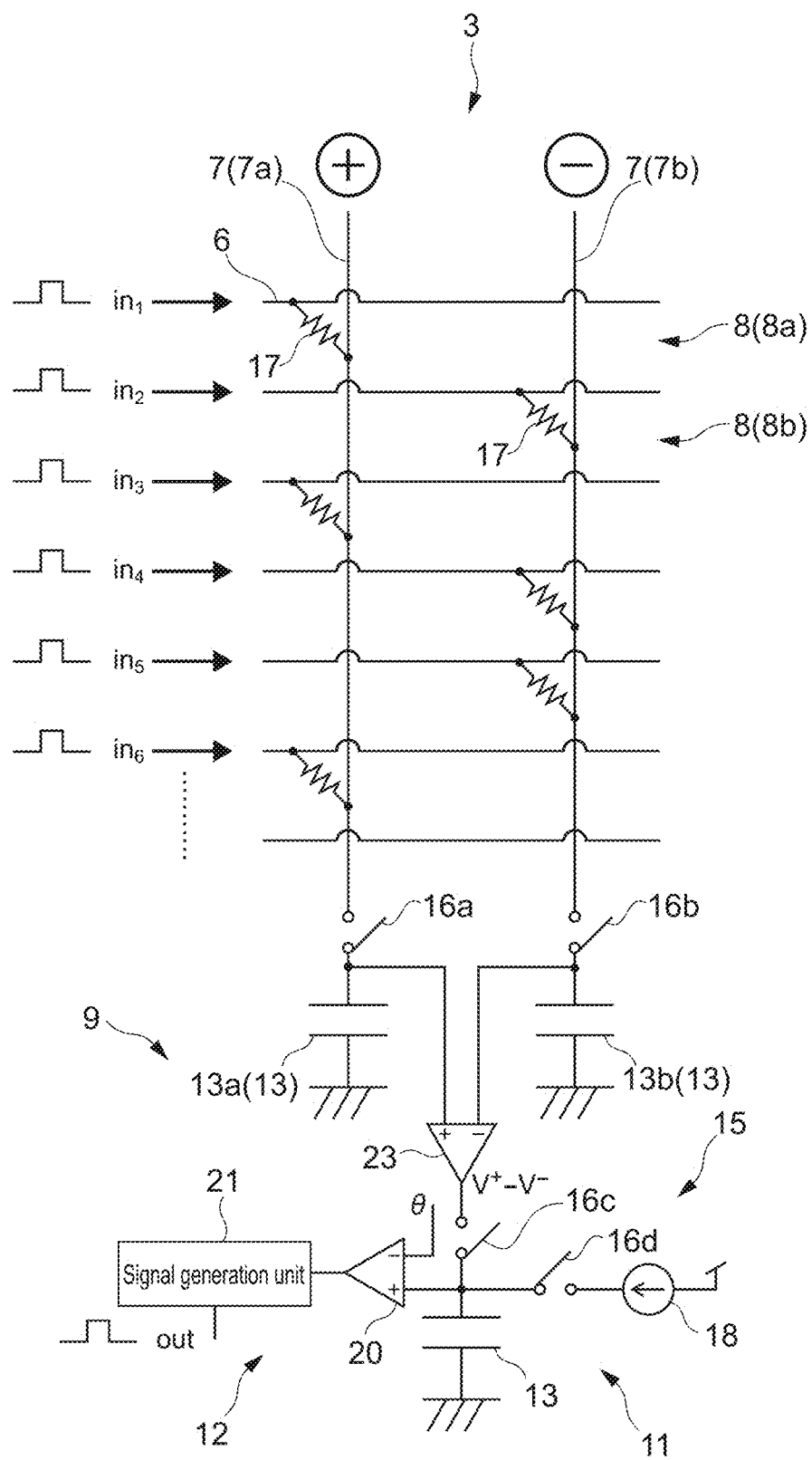
FIG. 8 A schematic circuit diagram showing another example of the analog circuit of the PWM method.
Figure 9:
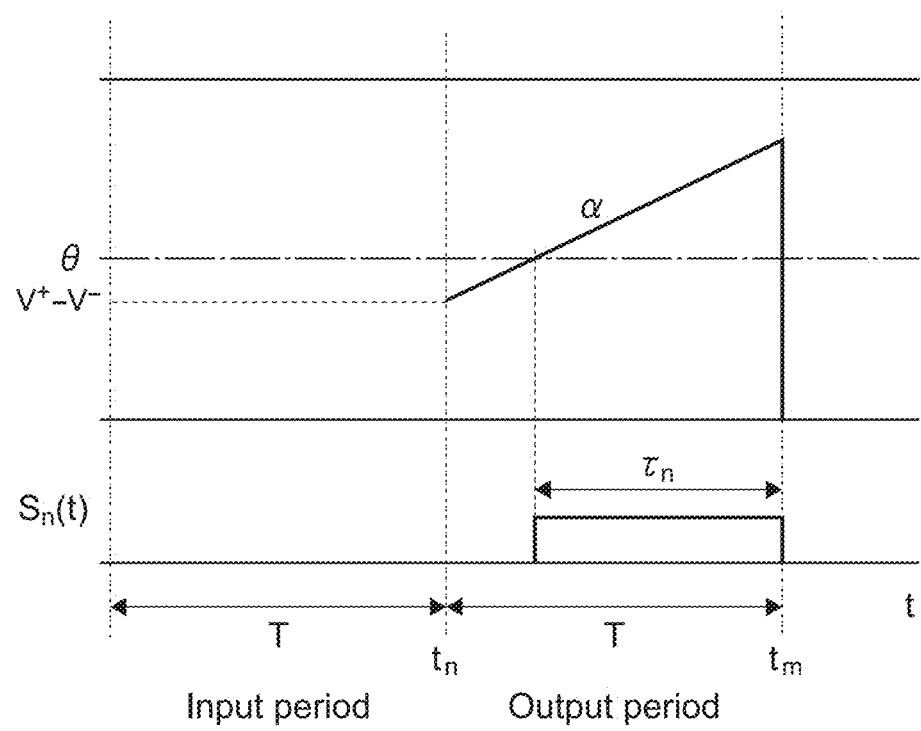
FIG. 9 A diagram for describing a calculation example of a multiply-accumulate signal by the analog circuit shown in FIG. 8.

FIG. 8 is a schematic circuit diagram showing another example of the analog circuit 3 according to the PWM method. FIG. 9 is a diagram for describing a calculation example of the multiply-accumulate signal by the analog circuit 3 shown in FIG. 8.

In the analog circuit 3 illustrated in FIG. 8, a differential amplification circuit 23 outputs a charge ($V_+-V_-$) corresponding to the difference between the total amount of positive weight charge and the total amount of negative weight charge, and the capacitor 13 included in the accumulation unit 11 accumulates the charge ($V_+-V_-$). The specific configuration of the differential amplification circuit 23 is not limited and may be arbitrarily designed.

At the start timing of the input period T, the switches 16a, 16b, and 16c are turned on and the switch 16b is turned off. An input signal is input within the input period T. The charge ($V_+-V_-$) output by the differential amplification circuit 23 is accumulated in the capacitor 13. It should be noted that the charge accumulation state in the input period T is omitted from FIG. 9.

At the end timing $t_n$ of the input period T, the switch 16c is turned off and the switch 16d is turned on. As shown in FIG. 9, charging by the charging unit 15 (current source 18) is started at the end timing $t_n$ of the input period T.

Moreover, the comparator 20 of the signal output unit 12 detects the timing at which the voltage retained by the capacitor 13 exceeds the threshold value θ. On the basis of the detected timing, the signal generation unit 21 calculates a multiply-accumulate signal (PWM signal) "$S_n(t)$".

Thus, by performing threshold determination on the charge ($V_+-V_-$) corresponding to the difference between the total amount of positive weight charge and the total amount of negative weight charge, it is possible to output the multiply-accumulate signal "$S_n(t)$".

It should be noted that in the description of the multiply-accumulate operation by the analog circuit 3 according to the PWM method described above, a change in the internal state (potential) in each synapse circuit 8 or an increase in voltage of the capacitor 13 due to charging is approximated as a linear change. As a matter of course, it is not at all difficult to perform the multiply-accumulate operation without such an approximation, and conversely, and it is possible to improve the accuracy of the multiply-accumulate operation in consideration of the parasitic capacitance of the synapse circuit 8 and the like.

In any case, in the analog circuit 3 (multiply-accumulate device) according to the present technology, the multiply-accumulate result of can be obtained on the basis of the potential of the positive charge output line 7a (the voltage retained by the capacitor 13a) $V^+$ and the potential of the negative charge output line 7b (the voltage retained by the capacitor 13b) $V^-$.

[Analog Circuit According to TACT Method]

Figure 10:
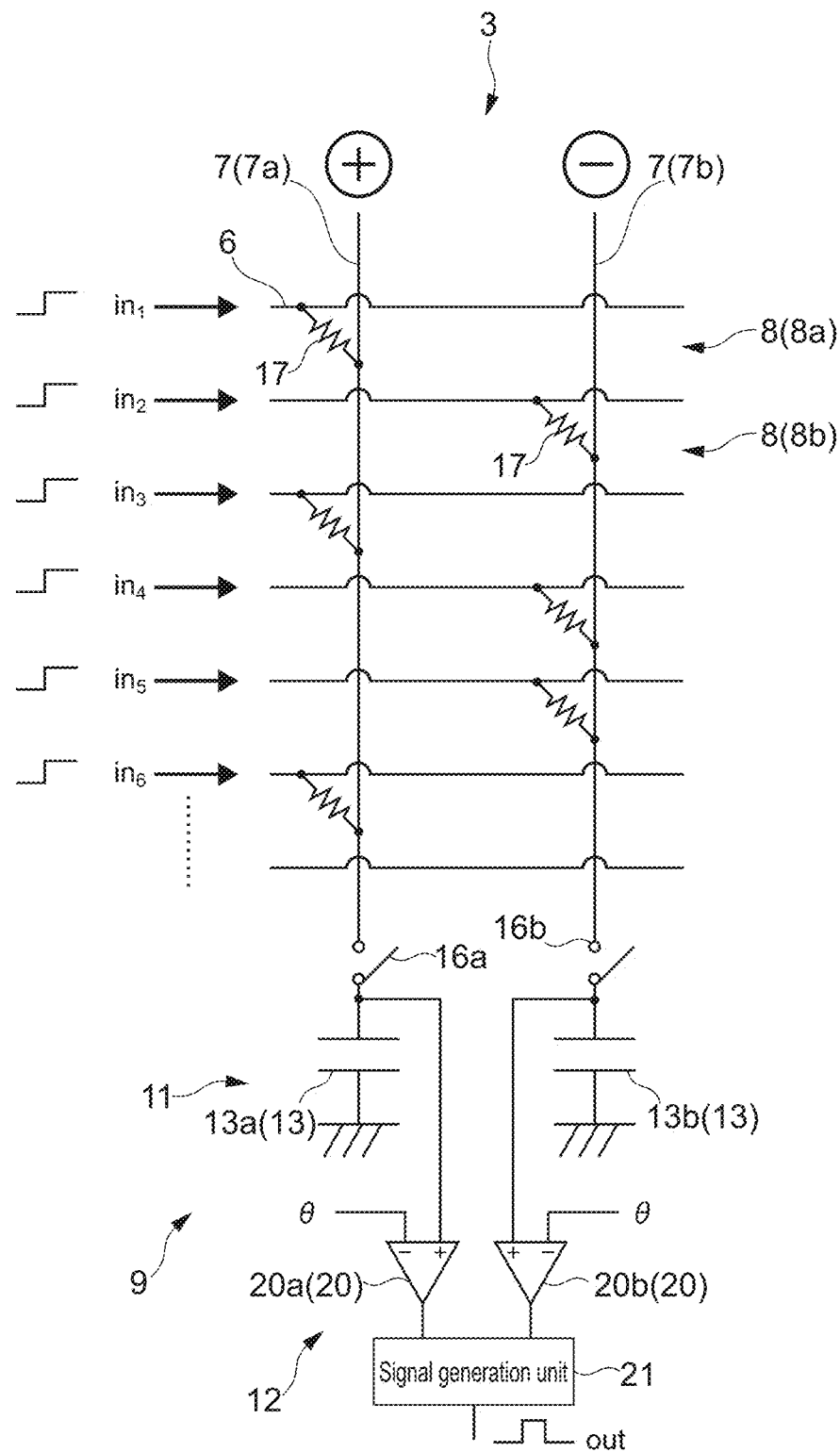
FIG. 10 A schematic circuit diagram showing an example of an analog circuit of a TACT method.

FIG. 10 is a schematic circuit diagram showing an example of the analog circuit 3 according to the TACT method. Pulse signals (TACT signals) are input into the plurality of input signal lines 6 as input signals in$_1$ to in$_6$ at a timing corresponding to the signal value $x_i$.

Here, a continuous pulse signal that rises to a timing corresponding to the input value and keeps the ON level as illustrated in FIG. 2B is input. Regarding the pulse signal, the duration of the ON time with respect to the input period T corresponds to the input value in the input period T. Hereinafter, the duration of the ON time in the input period T will be referred to as a pulse width in the input period T in some cases.

At a timing at which the input period T elapses, the charges accumulated in the capacitor 13a are the sum total σ$^+$ of the positive weight charges each corresponding to the product value of the positive weight value $w_i^+$. Also, the charges accumulated in the capacitor 13b are the sum total σ⁻ of the negative weight charges each corresponding to the product value of the negative weight value $w_i^-$.

Since the ON level of the electrical signal is maintained also after the input period T ends, charges are accumulated in the capacitor 13a and the capacitor 13b. A multiply-accumulate signal (PWM signal) representing the multiply-accumulate result of the positive weight charges is generated on the basis of the timing at which the voltage retained by the capacitor 13a exceeds the threshold value θ.

Moreover, a multiply-accumulate signal (PWM signal) representing the multiply-accumulate result of the negative weight charges is generated on the basis of the timing at which the voltage retained by the capacitor 13b exceeds the threshold value θ. A multiply-accumulate signal representing the total multiply-accumulate result can be generated on the basis of these positive and negative multiply-accumulate signals.

Here, the inventor examined the time constant of the positive charge output line 7a and the negative charge output line 7b as parameters associated with the potential V⁺ of the positive charge output line 7a and the potential V⁻ of and the negative charge output line 7b. That is, the inventor examined the time constant of the output lines 7. As a result, as described below, the inventor found a configuration that makes the time constant constant for the output lines 7 irrespective of the number of resistors 17 disposed between the output lines 7 and the plurality of input signal lines 6.

First, it is assumed that the capacitors 13a and 13b functionally include a parasitic capacitance (not shown) generated in the output lines 7a and 7b. In this case, a minimum value of the capacitance that can be taken by the capacitors 13a and 13b is a parasitic capacitance generated in the output lines 7. For example, even in a case where the capacitors 13 are not provided, charges are accumulated on the basis of the parasitic capacitance generated in the output lines 7a and 7b and a multiply-accumulate signal can be generated on the basis of the threshold determination. The same applies to the analog circuit 3 according to the PWM method illustrated in FIG. 8 and the like.

The time constant of the output lines 7 sequentially changes in accordance with the number of input signals sequentially input over time and the number of resistors 17 (on-resistances) in a state capable of transmitting a signal to the output lines 7. Here, the focus is placed on the time constant at the end of the input period T. In the analog circuit 3 according to the TACT method according to this embodiment, signals are input into all of the input signal lines 6 at the end of the input period T. Therefore, the number of input signals at the end of the input period T takes a maximum value and a constant value. As a result, the time constant at the end of the input period T sequentially changes in accordance with the number of on-resistances.

Here, the resistance values of the resistors 17 are set to be the same resistance value R. In other words, a binary connect configuration is employed. Moreover, the parasitic capacitance of each synapse circuit 8 is designed to be a constant capacitance C. Since the resistors 17 are connected in parallel to one output line 7, the combined resistance is R/N in a case where N resistors 17 are connected (the number of on-resistances is N). On the other hand, since the number of synapse circuits 8 is N which is equal to the number of resistors 17, the combined capacitance is NC.

For example, a multiply-accumulate signal is generated on the basis of the parasitic capacitance of each synapse circuit 8 without providing the capacitors 13. In this case, the value of the combined resistance×combined capacitance is RC irrespective of the number of resistors 17 (number of on-resistances). Therefore, the time constant of the output lines 7 at the end of the input period T is also RC irrespective of the number of resistors 17.

In a case where the capacitors 13 are installed, the capacitance of the capacitors 13 is set to a value (number of resistors 17×$C_0$) obtained by multiplying a predetermined constant $C_0$ by the number of resistors 17 (number of on-resistances). Accordingly, the time constant is R/N×(NC+N$C_0$)=R×(C+$C_0$) and is constant irrespective of the number of resistors 17. Thus, the time constant can be made constant irrespective of the number of resistors 17.

Therefore, the potential V of each output line 7 at the end of the input period T can be approximated by the following expression.

$$V = V_c\left(1 - e^{-\frac{t_{ave}}{R \cdot C}}\right) \quad \text{[Formula 13]}$$

Figure 11:
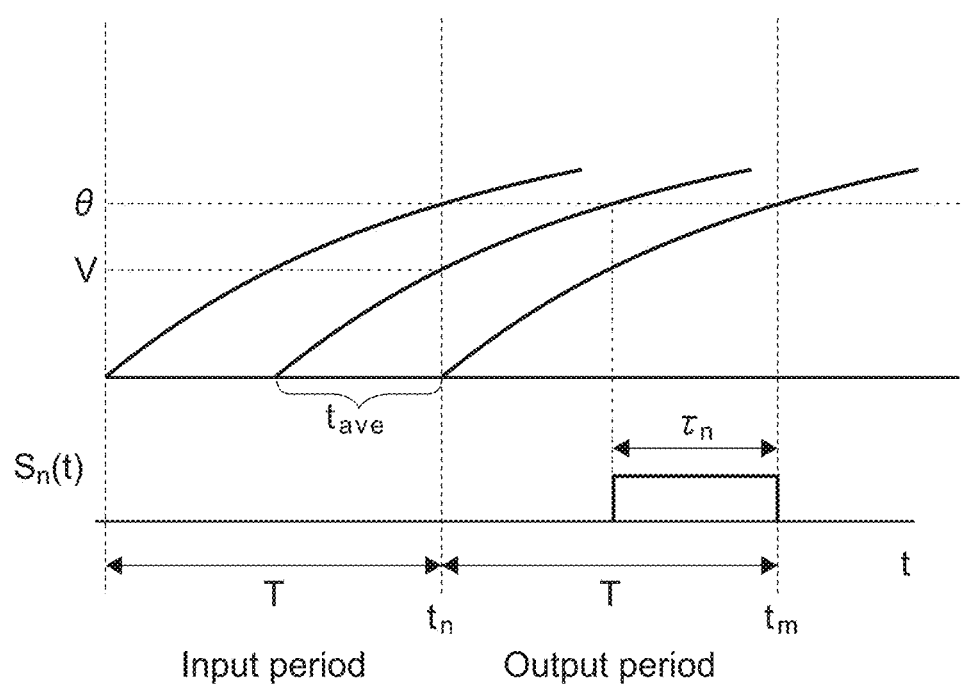
FIG. 11 A schematic graph for describing a potential of each output line at the time of an input period.

FIG. 11 is a schematic graph for describing the potential V of each output line 7 at the end of the input period T. The potential V of each output line 7 at the end of the input period T will be described with reference to the expression (Formula 13) and FIG. 11. It should be noted that the curve in the graph of FIG. 11 is a curve corresponding to the expression (Formula 13).

"Vc" represents a constant and is a value corresponding to the convergence value of the potential after a time equal to or longer than the time constant has elapsed. "$t_{ave}$" represents the average of pulse widths of the pulse signals input into the input signal lines 6 within the input period T.

As shown in FIG. 11, the input period T and the threshold value θ are determined on the basis of the curve corresponding to the expression (Formula 13). That is, the potential V when the input period T is substituted for "$t_{ave}$" of (Formula 13) is set as the threshold value θ. Accordingly, in a case where the maximum pulses whose pulse width in the input period T is maximum are input into all the input signal lines 6, the potential of the output line 7 exceeds the threshold value at the end timing of the input period T (start timing of the output period T).

On the other hand, in a case where the pulses whose pulse width in the input period T is 0 are input into all the input signal lines 6, the potential of the output line 7 exceeds the threshold value at the end timing of the output period T. As a result, it is possible to accurately calculate the multiply-accumulate signal with high resolution within the output period T. That is, by setting the threshold value θ on the basis of the duration of the input period T, an advantageous effect can be exhibited.

As shown in FIG. 11, the threshold determination is performed on each of the capacitors 13a and 13b on the basis of the threshold value θ. Accordingly, the multiply-accumulate signal "$S_n(t)$" using "$t_{ave}$" that is the average of the pulse widths of the respective pulse signals in the input period T as the pulse width "$τ_n$" can be generated and output accurately. It should be noted that the charge of each output line 7 does not always occur in accordance with the curve shown in FIG. 11. It was found that at least the potential V of each output line 7 at the end of the input period T and the pulse width "$τ_n$" of the multiply-accumulate signal "$S_n(t)$" can be approximated by the expression (Formula 13).

Irrespective of how the number of resistors 17 for connecting the input signal lines 6 and the positive charge output line 7a (i.e., the number of positive weight multiplication units), and the number of resistors 17 for connecting the input signal lines 6 and the negative charge output line 7b (i.e., the number of negative multiplication units) are combined in each analog circuit 3, the multiply-accumulate operation described in FIG. 11 is realized for the potential $V^+$ of the positive charge output line 7a and the potential $V^-$ of the negative charge output line 7b.

Therefore, as illustrated in FIG. 7, the multiply-accumulate signal "$S_n(t)$" representing the total multiply-accumulate result can be calculated on the basis of the pulse width $\tau_n^+$ of the multiply-accumulate signal $S_n^+(t)$ and the pulse width $\tau_n^-$ of the multiply-accumulate signal $S_n^-(t)$.

As a matter of course, other configurations and other multiply-accumulate operations may be performed as the analog circuit 3 according to the TACT method. In any case, the multiply-accumulate result can be obtained on the basis of the potential of the positive charge output line 7a (the voltage retained by the capacitor 13a) $V^+$ and the potential of the negative charge output line 7b (the voltage retained by the capacitor 13b) $V^-$.

In both the analog circuit 3 according to the PWM method and the analog circuit 3 according to the TACT method, the neuron circuit 9 includes the accumulation unit 11 that accumulates at least one of the positive weight charges generated by the positive weight multiplication units or the negative weight charges generated by the negative weight multiplication units and can output the multiply-accumulate signal representing the sum of the product values by performing threshold determination on the voltage, which is retained by the accumulation unit 11, with the predetermined threshold value.

Moreover, the accumulation unit 11 includes a positive charge accumulation unit capable of accumulating the positive weight charges generated by the positive weight multiplication units and a negative charge accumulation unit capable of accumulating the negative weight charges generated by the negative weight multiplication units. The neuron circuit 9 can output the multiply-accumulate signal by performing threshold determination on each of the positive charge accumulation unit and the negative charge accumulation unit with the predetermined threshold value. It should be noted that the predetermined threshold value may be set on the basis of the duration of the input period.

Here, the inventor examined the relationship between the multiply-accumulate signal "$S_n(t)$" output as the multiply-accumulate result and the noise caused by heat and the like (hereinafter, simply referred to as thermal noise). In the time-axis analog multiply-accumulate operation according to the PWM method and the time-axis analog multiply-accumulate operation according to the TACT method, the input value is normalized by using the input period T as time information as a reference.

For example, in the PWM method, the input value is standardized using the duty ratio $R_i$ of the pulse width $\tau_i$ to the input period T. In the TACT method, the input value is standardized at the predetermined timing in the input period T. For example, in a case where the pulse signal shown in FIG. 2B is used, the input value is standardized by using the pulse width in the input period T.

Moreover, the potential V of the output line 7 corresponding to the multiply-accumulate result is standardized by using the threshold value θ as a reference. That is, irrespective of the amount of input information, the multiply-accumulate result is standardized to a constant charge amount equal to or smaller than the threshold value. Therefore, since the multiply-accumulate result is reduced irrespective of the amount of input information, there remains room for consideration regarding the operation accuracy and the detection accuracy of the operation result.

For example, for detection of the multiply-accumulate signal "$S_n(t)$" representing the total multiply-accumulate result illustrated in FIG. 7, the noise level of the thermal noise limits the detection. That is, the output equal to or lower than the level of the thermal noise is automatically rejected as noise burying, and the accuracy of the multiply-accumulate operation may be lowered. However, it is currently difficult to quantitatively predict how much the minimum value of the multiply-accumulate value output from the plurality of analog circuits 3 included in the arithmetic apparatus 100 will be buried in the thermal noise.

The inventor focused on controlling the input time T for the time-axis analog multiply-accumulate operation according to the PWM method and the time-axis analog multiply-accumulate operation according to the TACT method. For example, the input time T is prolonged in the time-axis analog multiply-accumulate operation according to the PWM method described with reference to FIGS. 5 to 9. For the sake of clarity, it is assumed that the input time T is 1.2 times longer, for example.

Regarding the pulse signal according to the PWM method, which is input into the input signal line 6, the pulse width $\tau_i$ is also extended by 1.2 times because the input value corresponds to the duty ratio $R_i$ of the pulse width $\tau_i$ to the input period T. Accordingly, the potential of the positive charge output line 7a (the voltage retained by the capacitor 13a) $V^+$ and the potential of the negative charge output line 7b (the voltage retained by the capacitor 13b) $V^-$ are also increased.

Accordingly, the pulse width "$\tau_n^+$" of the multiply-accumulate signal "$S_n^+(t)$" representing the multiply-accumulate result of the positive weight charges illustrated in FIG. 7 and the pulse width "$\tau_n^-$" of the multiply-accumulate signal "$S_n^-(t)$" representing the multiply-accumulate result of the negative weight charge are also extended by 1.2 times. As a result, the pulse width "$\tau_n$" of the multiply-accumulate signal "$S_n(t)$" representing the total multiply-accumulate result is also extended by 1.2 times. It should be noted that the threshold value θ is set such that α=θ/T, for example, is established.

Moreover, in the time-axis analog multiply-accumulate operation according to the TACT method described with reference to FIGS. 10 and 11, it is assumed that the input time is, for example, extended by 1.2 times. Regarding the pulse signal according to the TACT method to be input into the input signal line 6, the pulse width in the input period T is extended by 1.2 times. Accordingly, the potential of the positive charge output line 7a (the voltage retained by the capacitor 13a) $V^+$ and the potential of the negative charge output line 7b (the voltage retained by the capacitor 13b) $V^-$ are also increased.

Accordingly, "$t_{ave}$" which is the average of the pulse widths of the pulse signals shown in FIG. 11 in the input period T is extended by 1.2 times. As a result, the pulse width "$\tau_n^+$" of the multiply-accumulate signal "$S_n^+(t)$" representing the multiply-accumulate result of the positive weight charges and the pulse width "$\tau_n^-$" of the multiply-accumulate signal "$S_n^-(t)$" representing the multiply-accumulate result of the negative weight charges are also extended by 1.2 times. As a result, the pulse width "$\tau_n$" of the multiply-accumulate signal "$S_n(t)$" representing the total multiply-accumulate result is also extended by 1.2 times. It should be noted that the threshold value θ is determined in accordance with the input period T on the basis of the curve corresponding to the expression (Formula 13), for example.

Thus, in the time-axis analog multiply-accumulate operation according to the PWM method and the time-axis analog multiply-accumulate operation according to the TACT method, the duration of the input period T is extended and the duration of the ON time of the pulse signal corresponding to the input value accordingly also extends. Moreover, the threshold value θ is set as appropriate on the basis of the duration of the input period T.

Accordingly, the potential $V^+$ of the positive charge output line 7a (the voltage retained by the capacitor 13a) and the potential $V^-$ of the negative charge output line 7b (the voltage retained by the capacitor 13b) can be increased. As a result, the value of the multiply-accumulate signal "$S_n(t)$" (pulse width "$\tau_n$") representing the total multiply-accumulate result can be extended. Accordingly, it is possible to reduce the amount of buried noise, and it is possible to accurately detect the multiply-accumulate operation result.

On the other hand, increasing the input period T can cause an increase in power consumption and processing time. The inventor further studied to improve the detection accuracy of the multiply-accumulate result while reducing the power consumption and processing time and newly devised a technology to be described below.

Figure 12:
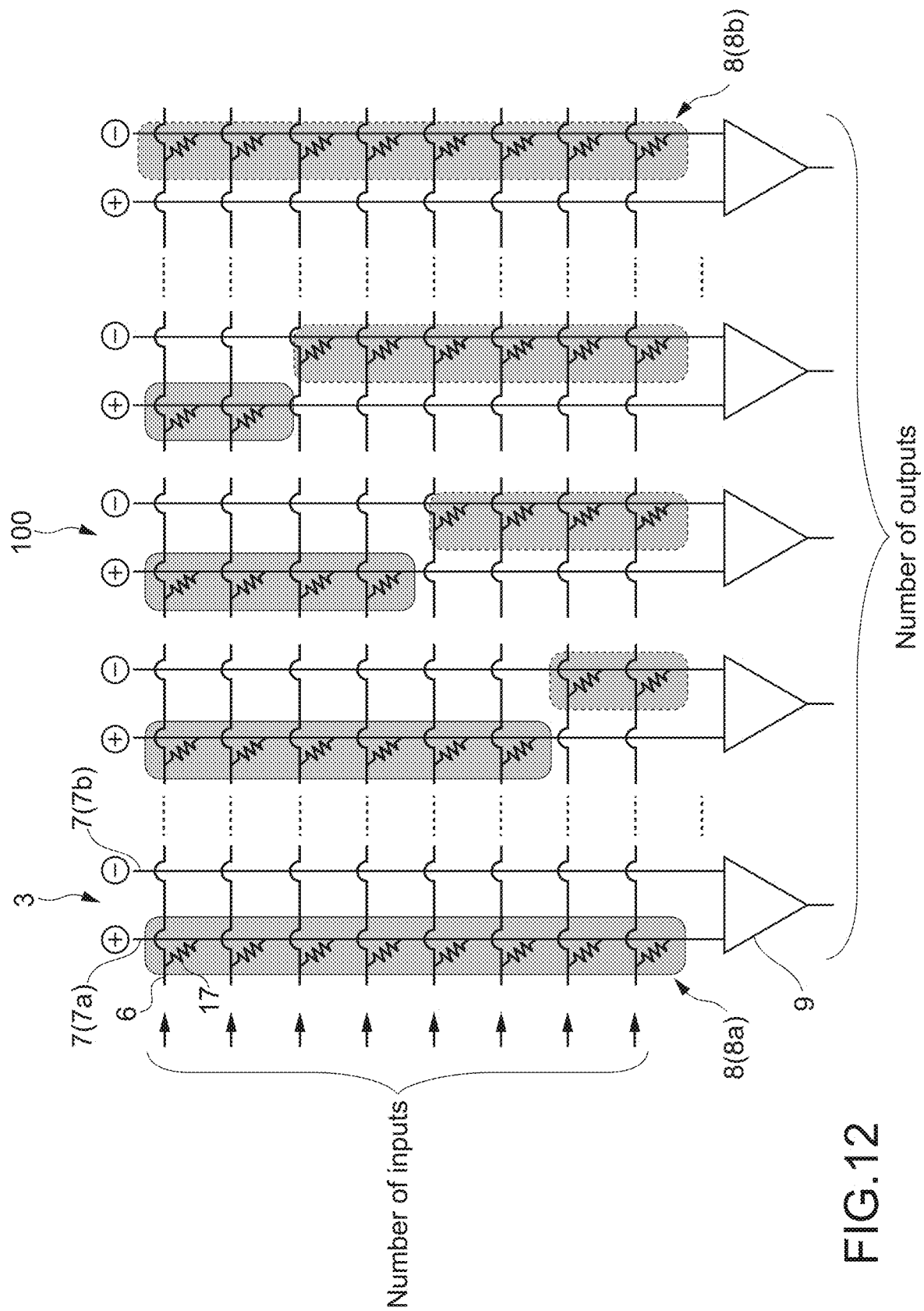
FIG. 12 A schematic diagram showing a configuration example of an arithmetic apparatus for describing simulation related to a time axis analog multiply-accumulate operation.

FIG. 12 is a schematic diagram showing a configuration example of an arithmetic apparatus for describing a simulation relating to the time-axis analog multiply-accumulate operation. For example, using the arithmetic apparatus 100 in which the plurality of analog circuits 3 according to the TACT method as illustrated in FIG. 10 is arranged, the simulation is performed under the following conditions.

Number of inputs . . . 500
Value of input signal . . . defined by normal distribution (variance is fixed) using a median value as the average.
Arrangement of input signals . . . set by a random number for each test
Weights . . . positive and negative, binary values
Positive weight ratio . . . normal distribution (variance is fixed) using 50% as the average.
Arrangement of weights . . . set by a random number for each test
Multiply-accumulate value . . . calculated as an absolute value Those conditions will be described. The value of the input signal is defined by a normal distribution averaging the pulse (median value) input at a timing of the input period T/2 (variance is a predetermined fixed value). That is, pulse signals corresponding to the input values according to such a distribution are input into the 500 input signal lines 6.

Which input signal line 6 each of the pulse signals corresponding to the 500 input values according to the normal distribution is input into is set by the random number for each test.

As the weights, the resistors 17 having the same resistance value are, in each analog circuit 3, connected to the positive side (between the input signal line 6 and the positive charge output line 7a) and the negative side (between the input signal line 6 and the positive charge output line 7b).

In a case where the resistor 17 is connected to the positive side, the synapse circuit 8a functioning as the positive weight multiplication unit is configured. In a case where the resistor 17 is connected to the negative side, the synapse circuit 8b functioning as the positive weight multiplication unit is configured. Hereinafter, the synapse circuits 8a and 8b will be referred to as a positive weight multiplication unit 8a and a negative weight multiplication unit 8b in some cases.

The positive weight ratio is a ratio of a sum total of the positive weight values to a sum total of absolute values of the weight values in each analog circuit 3. In this simulation, a binary connect configuration is employed. Thus, the positive weight ratio is the ratio of the number of resistors 17 connected to the positive side to the total number (500) of resistors 17. It can also be said that the positive weight ratio is a ratio of the number of positive weight multiplication units 8a to the number of synapse circuits 8.

For example, in a case where the resistors 17 are connected between all of the input signal lines 6 and the positive charge output line 7a, i.e., in a case where all of the multiplication units 8 serve as the positive weight multiplication units 8a, the positive weight ratio is 100%. In a case where the resistors 17 are connected between all of the input signal lines 6 and the negative charge output line 7b, i.e., in a case where all of the multiplication units 8 serve as the weight multiplication units 8b, the positive weight ratio is 0%.

In a case where the number of resistors 17 connected between the input signal lines 6 and the positive charge output line 7a and the number of resistors 17 connected between the input signal lines 6 and the negative charge output line 7b are equal, the positive weight ratio is 50%. That is, in a case where the number of positive weight multiplication units 8a and the number of weight multiplication units 8b are equal, the positive weight ratio is 50%.

That is, in the arithmetic apparatus 100, the plurality of multiplication units 8 includes at least one of the positive weight multiplication unit 8a or the weight multiplication unit 8b and is configured such that the positive weight ratio that is the ratio of the sum total of the positive weight values to the sum total of the absolute values of the weight values is any ratio of 0% to 100%. Moreover, the neuron circuit 9 accumulates at least one of the positive weight charges generated by the positive weight multiplication units 8a or the negative weight charges generated by the weight multiplication units 8b, to thereby output the multiply-accumulate signal.

In this simulation, the distribution of the positive weight ratios of the plurality of analog circuits 3 is defined by the normal distribution using 50% as the average (the variance is a predetermined fixed value). That is, the analog circuits 3 that provide the positive weight ratio of 50% are largest in number.

It should be noted that in each analog circuit 3, a ratio of a sum total of the negative weight values to the sum total of the absolute values of the weight values is a negative weight ratio. Moreover, in each analog circuit 3, a ratio of the sum total of the positive weight values to the sum total of the negative weight values is a positive and negative weight ratio. In the present disclosure, the positive weight ratio, the weight negative ratio, and the positive and negative weight ratio can be regarded as parameters equivalent to each other.

In the analog circuit 3 in which the positive weight ratio is determined, the position at which the resistor 17 is disposed is set by the random number for each test. For the sake of convenience, it is assumed that the number of inputs of the arithmetic apparatus 100 shown in FIG. 12 is 8. The positive weight ratio of the analog circuit 3 shown in the center is 50%. That is, four resistors 17 are connected to each of the positive side and the negative side. The positions of the four resistors 17 on the positive side and the positions of the four resistors 17 on the negative side are set by the random number for each test. It corresponds to that the position of the positive weight multiplication unit 8a and the position of the negative weight multiplication unit 8b are set by the random number.

The multiply-accumulate value is calculated as an absolute value and corresponds, for example, to the pulse width "$\tau_n$" of the multiply-accumulate signal "$S_n(t)$" representing the total multiply-accumulate result illustrated in FIG. 7.

The simulation is performed multiple times under such conditions. As a result, it was found that the average value, the median value, and the maximum value of the multiply-accumulate value tends to fall within a certain range. That is, it was possible to find out a predictable range for the average value, the median value, and the maximum value of the multiply-accumulate value. On the other hand, regarding the minimum value of the multiply-accumulate value, variations were observed from test to test, and it was difficult to predict it.

Here, the inventor focused on the distribution of the positive weight ratios of the plurality of analog circuits 3. Regarding the positive weight ratio which is one of the simulation conditions, the average of the normal distribution was fixed to 50% and the simulation was performed multiple times by varying the variance. As a result, it was newly found that there is a dependency between the distribution of the positive weight ratios and the minimum value of the multiply-accumulate value.

Specifically, it was found that as the variance of normal distributions of the positive weight ratios becomes smaller, the minimum value of the multiply-accumulate value tends to be smaller. Conversely, it was found that as the normal distribution of the positive weight ratios becomes larger, the minimum value of the multiply-accumulate value tends to be larger. Moreover, it was found that as the average of normal distributions of the positive weight ratios became closer to 50%, the minimum value of the multiply-accumulate value tends to be smaller.

For example, it is assumed that the positive weight ratio is 50% and the sum total of the positive weights (the number of resistors) and the sum total of the negative weights (the number of resistors) are equal. In this case, a difference between the average of pulse widths of the pulse signals input into the positive weight multiplication unit 8a within the input period T and the average of pulse widths of the pulse signals input into the weight multiplication unit 8b within the input period T is a parameter associated with the minimum value of the multiply-accumulate value.

Perhaps, it can be considered that in a case of inputting pulse signals randomly into the input signal lines 6 equal in number to each other (every 250 in this simulation), averages of pulse widths in the input period T are close to each other. Therefore, it can be considered that as the average of normal distributions of the positive weight ratios is closer to 50%, the minimum value of the multiply-accumulate value tends to be smaller. This idea is, as a matter of course, an inference about newly found tendency.

Moreover, it can be considered that this tendency appears also in a case where multi-value weights different from those of the binary connect are set. It can be considered that as the sum total of the positive weights and the sum total of the negative weights are values closer to each other, the multiply-accumulate value is smaller.

On the basis of such a tendency, it is possible to roughly predict the minimum value of the multiply-accumulate value by the positive weight ratio. It is possible to efficiently reduce the amount of buried thermal noise while reducing the power consumption.

Specifically, as more positive weight ratios of the plurality of analog circuits 3 are distributed close to 50%, the input period T is set to be longer. Accordingly, it is possible to reduce the amount of buried noise, and it is possible to accurately detect the multiply-accumulate operation result. Moreover, it is possible to prevent the input period T from becoming longer than necessary. That is, it is possible to properly adjust the input period T, and it is possible to increase the level of the multiply-accumulate signal while reducing the power consumption and processing time.

For example, in a case of constructing a neural network or the like, parameters such as the number of inputs, the number of outputs, the weight value, and the weight ratio, are often determined by learning processing of a computer such as a server apparatus. The arithmetic apparatus 100 capable of desired multiply-accumulate operation is realized by designing the analog circuit 3 on the basis of the determined parameters as appropriate.

For example, during design of the analog circuit 3, the input time T is set on the basis of the distribution of the positive weight ratios of the plurality of analog circuits 3 on the basis of the determined parameters. For example, the input period T is set on the basis of at least one of the average or the variance of the positive weight ratios of the plurality of analog circuits 3.

Specifically, as more positive weight ratios of the plurality of analog circuits 3 are distributed close to 50%, the input time T is set to be longer. For example, as the average of the positive weight ratios of the plurality of analog circuits 3 becomes closer to 50%, the input time T is set to be longer. Moreover, in a case where the average of the positive weight ratios of the plurality of analog circuits 3 is close to 50%, as the variance of the positive weight ratios becomes smaller, the input period T is set to be longer. By performing such a setting method, it is possible to increase the level of the multiply-accumulate signal output from each analog circuit 3 while reducing the power consumption. As a result, it is possible to accurately detect the operation result.

[Noise Burying Determination Circuit]

Figure 13:
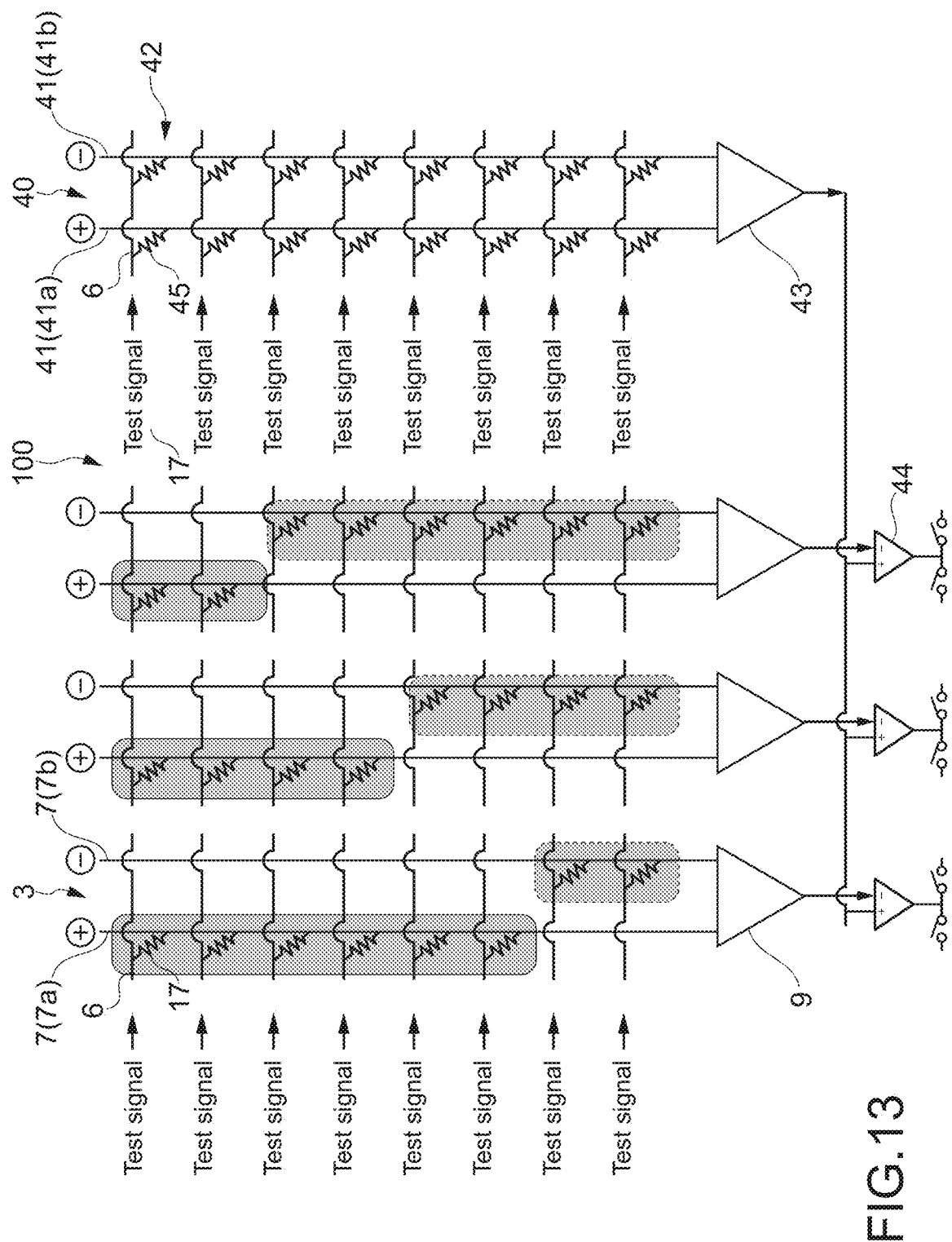
FIG. 13 A schematic diagram showing a configuration example of a noise burying determination circuit.

FIG. 13 is a schematic diagram showing a configuration example of a noise burying determination circuit. For example, a noise burying determination circuit 40 for determining the number of analog circuits 3 which have a high possibility that the multiply-accumulate signal output from the neuron circuit 9 is lower than the noise level is provided in the arithmetic apparatus 100. The input period T may be set on the basis of the number of analog circuits 3 of the plurality of analog circuits 3 which have a high possibility that the multiply-accumulate signal output from the neuron circuit 9 is lower than the noise level.

Here, a case where the analog circuit 3 including the configurations up to the differential amplification circuit 23 shown in FIG. 8 is used is shown as an example. That is, it is assumed that each of the neuron circuits 9 shown in FIG. 13 includes the switches 16a and 16b, the capacitors 13a and 13b, and the differential amplification circuit 23 shown in FIG. 8 and outputs the charge ($V_+ - V_-$) corresponding to a difference between the total amount of positive weight charge and the total amount of negative weight charge as the multiply-accumulate signal.

That is, in the present technology, the multiply-accumulate signal representing the sum of the product values includes not only the multiply-accumulate signal "$S_n(t)$" (pulse signal) illustrated in FIG. 7, but also a charge signal (voltage signal) based on the charge ($V_+ - V_-$) corresponding to the difference between the total amount of positive weight charge and the total amount of negative weight charge.

Moreover, it is assumed that a binary connect configuration is employed. That is, as the resistor 17, a resistor having the same resistance value is used.

As shown in FIG. 13, the noise burying determination circuit 40 includes a positive charge output line 41a, a negative charge output line 41b, a plurality of synapse circuits 42, a neuron circuit 43, and a plurality of comparators 44.

The positive charge output line 41a and the negative charge output line 41b are, as in the plurality of analog circuits 3, provided to be orthogonal to the plurality of input signal lines 6. FIG. 13 indicates that the same test signals are input into the plurality of analog circuits 3 and the noise burying determination circuit 40. As an actual configuration, the plurality of analog circuits 3 and the noise burying determination circuit 40 (portion excluding the plurality of comparators 44) are configured in parallel with each other with respect to the common input signal line 6. The present technology is not limited thereto, and the noise burying determination circuit 40 may be configured without being connected to the plurality of analog circuits 3.

The plurality of synapse circuits 42 is provided to be associated with the plurality of input signal lines 6, respectively. Each of the plurality of synapse circuits 42 includes shared resistors 45 connected between the corresponding input signal line 6 of the plurality of input signal lines 6 and the positive charge output line 41a and between the corresponding input signal line 6 of the plurality of input signal lines 6 and the negative charge output line 41b. This resistor 45 may have a non-linear characteristic and may have a function of preventing backflow of current. The resistance value of the resistor 45 is the same as the resistance value of the resistor 17 provided in the analog circuit 3.

Thus, each synapse circuit 42 generates and outputs a charge corresponding to the product value $(w_i^+ * x_i)$ on the positive charge output line 41a. Moreover, each synapse circuit 42 generates and outputs a charge corresponding to the product value $(|w_i^-| * x_i)$ on the positive charge output line 41b. That is, in the noise burying determination circuit 40, the charge corresponding to the product value $(w_i^+ * x_i)$ and the charge corresponding to the product value $(|w_i^-| * x_i)$ are both output from each synapse circuit 42. In this embodiment, the plurality of synapse circuits 42 functions as a plurality of determination multiplication units.

The neuron circuit 43 has a configuration similar to that of the neuron circuit 9 of the analog circuit 3. That is, the neuron circuit 43 includes the switches 16a and 16b, the capacitors 13a and 13b, and the differential amplification circuit 23 shown in FIG. 8, and the charge $(V_+ - V_-)$ corresponding to the difference between the total amount of positive weight charge and the total amount of negative weight charge is used as a determination signal.

The plurality of comparators 44 is provided to be associated with the plurality of analog circuits 3, respectively. One terminal of the comparator 44 is connected to the output of the corresponding analog circuit 3. The output of the noise burying determination circuit 40 is connected to the other terminal of the comparator 44.

In this embodiment, the comparator 44 outputs a signal when the potential output as the multiply-accumulate signal from each analog circuit 3 exceeds the potential output as the determination signal from the noise burying determination circuit 40. As a matter of course, the present technology is not limited thereto, and the comparator 44 may output a signal when the potential output as the determination signal from the noise burying determination circuit 40 exceeds the potential output as the multiply-accumulate signal from each analog circuit 3.

In this embodiment, the plurality of comparators 44 functions as a determination unit for determining the number of multiply-accumulate signals of a plurality of multiply-accumulate signals output from the plurality of analog circuits 3, which are smaller than the determination signal. In this embodiment, the number obtained by subtracting the number of comparators 44 that have output signals from the total number of analog circuits 3 is the number of multiply-accumulate signals smaller than the determination signal.

Figure 14:
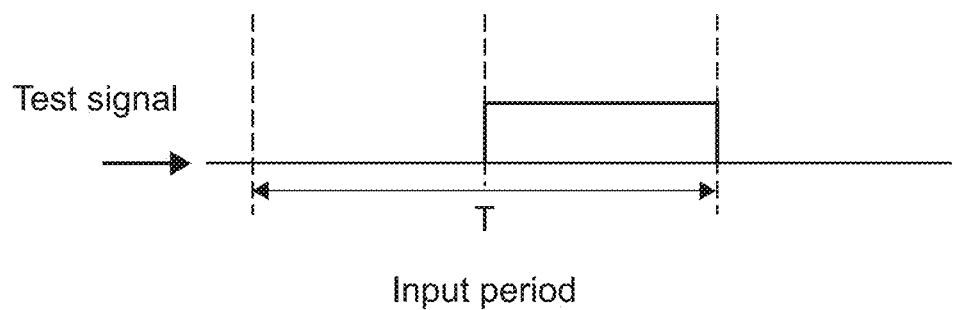
FIG. 14 A schematic diagram showing an example of a test signal.

FIG. 14 schematically shows an example of the test signal. When determining the amount of buried noise, electrical signals corresponding to the same input value are input into the plurality of input signal lines 6. In the example shown in FIG. 14, a PWM signal whose pulse width is T/2 is used as the test signal. The present technology is not limited thereto, and any electrical signal corresponding to the same input value may be used.

When the test signals are input into the plurality of input signal lines 6, the charge $(V_+ - V_-)$ is output as the multiply-accumulate signal from each analog circuit 3. From the noise burying determination circuit 40, $(V_+ - V_-)$ is output as the determination signal.

As shown in FIG. 13, in the noise burying determination circuit 40, the same resistors 45 are connected to both the positive and negative sides in each synapse circuit 42. Therefore, the charge $(V_+ - V_-)$ corresponding to the difference between the total amount of positive weight charge and the total amount of negative weight charge can be regarded as a noise component. Therefore, the magnitude of the determination signal can be regarded as the noise level.

The plurality of comparators 44 determines the number of analog circuits 3 in which the multiply-accumulate signal is lower than the noise level. On the basis of the number determined by the plurality of comparators 44 when the test signals are input into the plurality of input signal lines 6, it is possible to determine the number of analog circuits 3 of the plurality of analog circuits 3 which have a high possibility that the multiply-accumulate signal output from the neuron circuit 9 is lower than the noise level.

It can also be said that the noise burying determination circuit 40 is a circuit capable of detecting the number of outputs "Mx" in which the outputs of the respective analog circuits 3 are equal to or lower than the detection limit. The duration of the input period T is controlled on the basis of a ratio of the number of outputs "Mx" to the total number "M" of analog circuits 3. For example, in a case where the ratio of the number of outputs "Mx" to the total number "M" is larger than a predetermined threshold value, the input period T is set to be longer. Accordingly, it is possible to reduce the amount of buried noise, and it is possible to accurately detect the multiply-accumulate operation result.

It should be noted that a circuit capable of automatically setting the input period T and the threshold value θ on the basis of the outputs from the plurality of comparators 44 may be configured. Alternatively, an operator or the like may set the input period T and the threshold value θ during design of the arithmetic apparatus 100.

The noise burying determination circuit 40 can be realized also when the pulse signal illustrated in FIG. 7 is output as the multiply-accumulate signal. The pulse width of the pulse signal output as the multiply-accumulate signal from each analog circuit 3 is compared with the pulse width of the pulse signal output as the determination signal by the noise burying determination circuit 40. Accordingly, it is possible to determine the number of analog circuits 3 of the plurality of analog circuits 3 which have a high possibility that the multiply-accumulate signal output from the neuron circuit 9 is lower than the noise level.

Moreover, also in a case where the binary connect configuration is not employed, the noise burying determination circuit 40 can be realized. For example, both the positive weight and the negative weight having the same value are configured in the determination multiplication unit of the noise burying determination circuit 40. Accordingly, it is possible to realize the noise burying determination circuit 40 capable of outputting the determination signal corresponding to noise components.

Figure 15:
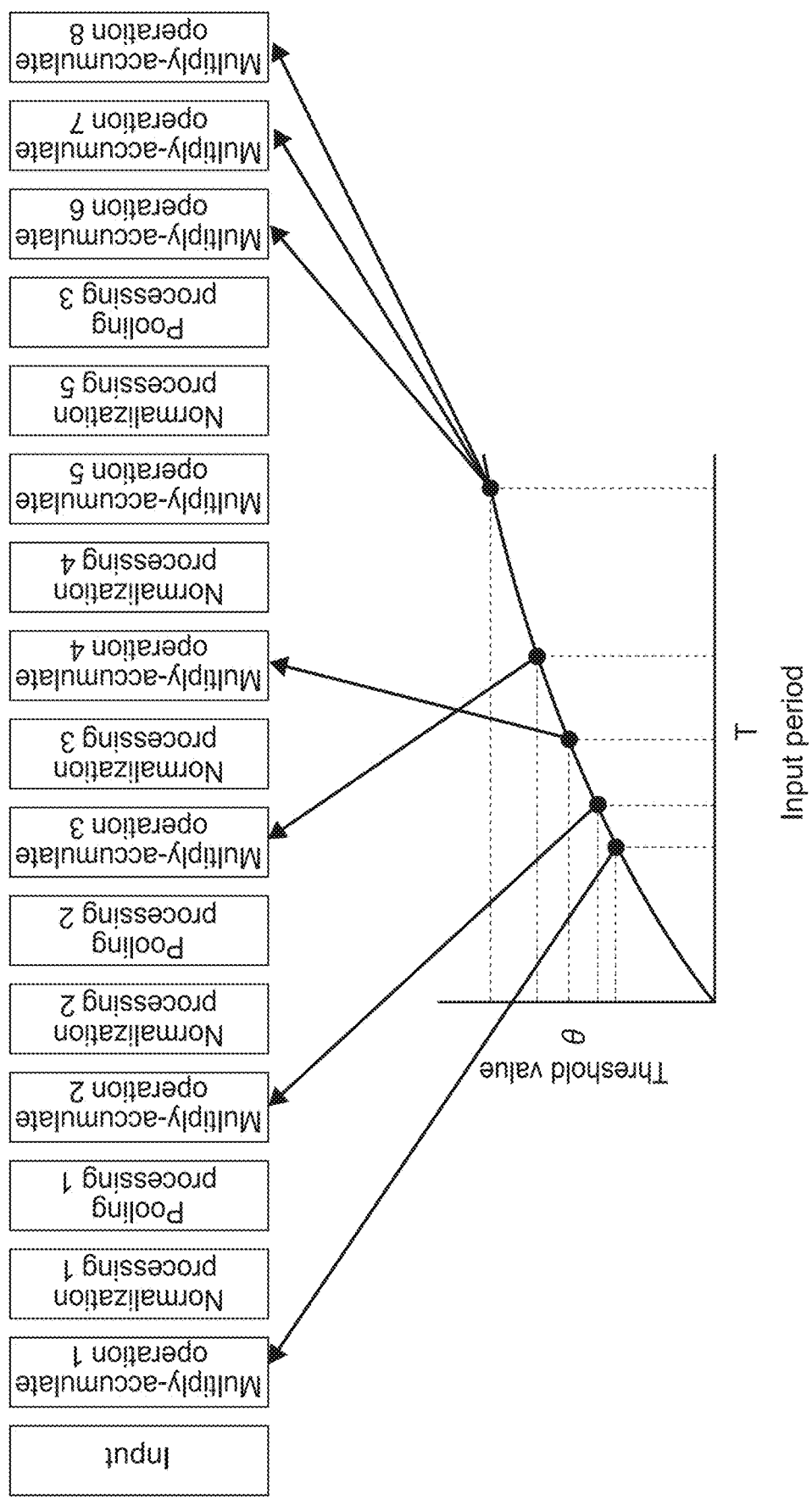
FIG. 15 A schematic diagram showing a configuration example of the neural network.

FIG. 15 is a schematic diagram showing a configuration example of the neural network. For example, as shown in FIG. 15, a neural network is realized by performing a plurality of multiply-accumulate operations, a plurality of normalization processes, and a plurality of pooling processes.

Here, the multiply-accumulate operation corresponds to the output of a plurality of multiply-accumulate results by the arithmetic apparatus 100 including the plurality of analog circuits 3. The normalization processing is processing of normalizing the input signal for the input of the multiply-accumulate operation at the next stage. The pooling processing is processing of reducing the number of input signals in accordance with the number of inputs of the multiply-accumulate operation at the next stage. By the normalization processing and the pooling processing, it is possible to simplify the processing and shorten the processing time.

As shown in FIG. 12, when each multiply-accumulate operation is performed, it is possible to optimize the input period T and the threshold value θ on the basis of the distribution of the positive weight ratios of the plurality of analog circuits 3 and the determination result of the amount of buried noise. As a result, the multiply-accumulate operation result can be detected with very high accuracy.

It should be noted that in FIG. 12, a case where the arithmetic apparatus 100 that performs each of multiply-accumulate operations 1 to 8 is constituted by the plurality of analog circuits 3 designed with a common time constant is shown. Therefore, the input period T and the threshold value θ are set on the basis of a curve common time constant in each arithmetic apparatus 100. In FIG. 12, the input period T is set to be different in each arithmetic apparatus 100. The present technology is not limited thereto, and a common input period T and a common threshold value θ may be employed.

As a matter of course, the arithmetic apparatus 100 is constituted by the analog circuits 3 each having another configuration and the multiply-accumulate operations may be performed. Also in this case, it is possible to accurately detect the operation result by properly setting the input period T and the threshold value θ on the basis of the distribution of the positive weight ratios of the plurality of analog circuits 3 and the determination result of the amount of buried noise.

Above, in the arithmetic apparatus 100 according to this embodiment, the duration of the input period of the electrical signal corresponding to the input value is set on the basis of the distribution of the positive weight ratios of the plurality of analog circuits 3. Accordingly, it is possible to increase the level of the multiply-accumulate signal output from each analog circuit 3 while reducing the power consumption. As a result, it is possible to accurately detect the operation result.

Other Embodiments

The present technology is not limited to the embodiment described above, and various other embodiments can be realized.

In the above description, the case of outputting the multiply-accumulate signal on the basis of the timing at which the voltage retained by the accumulation unit increases beyond the threshold value has been exemplified. However, a configuration to output the multiply-accumulate signal on the basis of the timing at which the voltage retained by the accumulation unit decreases beyond the threshold voltage may be employed. For example, charging is performed in advance until the voltage of the capacitor that functions as the accumulation unit reaches a predetermined preset value. After the sum of charges each corresponding to the product value of the signal value and the weight value is accumulated, the capacitor is discharged at a predetermined rate. In such a case, the multiply-accumulate signal can be output on the basis of a timing at which the voltage retained by the capacitor decreases beyond the threshold value. As a matter of course, the present technology is not limited to such a configuration. It should be noted that in the present disclosure, discharging the capacitor is included in charging the capacitor with negative charges.

In the above description, the case where the pair of output lines is used has been described. The present technology is not limited thereto, and three or more output lines may be provided. That is, the present technology described above can be applied also in a case where one or more any number of output lines are used. For example, the multiplication unit includes a resistor that is connected between an associated input line and any one of the one or more output lines and defines a weight value, and outputs a charge corresponding to the product value to the output line to which the resistor is connected. As a matter of course, the present technology is not limited thereto.

The configurations of the arithmetic apparatus, the multiply-accumulate devices, the analog circuits, the synapse circuits, the neuron circuits, and the like, the method of generating the multiply-accumulate signal, and the like described above with reference to the drawings belong to merely an embodiment, and can be arbitrarily modified without departing from the gist of the present technology. That is, any other configurations, methods, and the like for carrying out the present technology may be employed.

In the present disclosure, "the same", "equal", "orthogonal", and the like are concepts including "substantially the same", "substantially equal", "substantially orthogonal", and the like. For example, the states included in a predetermined range (e.g., a range of ±10%) with reference to "completely the same", "completely equal", "completely orthogonal", and the like are also included.

At least two of the features of the present technology described above can also be combined. In other words, various features described in the respective embodiments may be combined discretionarily irrespective of the embodiments. Moreover, the various effects described above are not limitative but are merely illustrative, and other effects may be provided.

It should be noted that the present technology can also take the following configurations.

(1) An arithmetic apparatus, including:
a plurality of input lines into each of which an electrical signal corresponding to an input value is input within a predetermined input period; and a plurality of multiply-accumulate devices each including
- a plurality of multiplication units that each generates, on the basis of the electrical signal input into each of the plurality of input lines, a charge corresponding to a product value obtained by multiplying the input value by a weight value, and
- an output unit that accumulates a charge corresponding to the product value generated by each of the plurality of multiplication units and outputs, on the basis of the accumulated charge, a multiply-accumulate signal representing a sum of the product values, in which
  the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a positive weight ratio that is a ratio of a sum total of the positive weight values to a sum total of absolute values of the weight values is any ratio of 0% to 100%, and
  the output unit accumulates at least one of the positive weight charge generated by the positive weight multiplication unit or the negative weight charge generated by the negative weight multiplication unit, to thereby output the multiply-accumulate signal, in which
  a duration of the input period is set on the basis of a distribution of the positive weight ratios of the plurality of multiply-accumulate devices.

(2) The arithmetic apparatus according to (1), in which the electrical signal corresponding to the input value is a pulse signal having a duration of an ON time with respect to the input period, the duration corresponding to the input value.

(3) The arithmetic apparatus according to (1) or (2), in which the duration of the input period is set on the basis of at least one of an average or a variance of the positive weight ratios.

(4) The arithmetic apparatus according to any one of (1) to (3), in which the duration of the input period is set to be longer as the positive weight ratios are more distributed close to 50%.

(5) The arithmetic apparatus according to any one of (1) to (4), in which the duration of the input period is set to be longer as the average of the positive weight ratios is closer to 50%.

(6) The arithmetic apparatus according to any one of (1) to (5), in which the duration of the input period is, in a case where the average of the positive weight ratios is close to 50%, set to be longer as the variance of the positive weight ratios is smaller.

(7) The arithmetic apparatus according to any one of (1) to (6), in which the duration of the input period is set on the basis of the number of multiply-accumulate devices of the plurality of multiply-accumulate devices which have a high possibility that the multiply-accumulate signal output from the output unit is lower than a noise level.

(8) The arithmetic apparatus according to (7), further including a determination circuit for determining the number of multiply-accumulate devices of the plurality of multiply-accumulate devices which have a high possibility that the multiply-accumulate signal output from the output unit is lower than the noise level.

(9) The arithmetic apparatus according to (8), in which the determination circuit includes
  a plurality of determination multiplication units that each generates, on the basis of the electrical signal input into each of the plurality of input lines, a positive weight charge corresponding to a product value obtained by multiplying the input value by a positive weight value and a negative weight charge corresponding to a product value obtained by multiplying the input value by a negative weight value having an absolute value equal to the positive weight value,
  a determination output unit that outputs a determination signal on the basis of a charge corresponding to a difference between the total number of positive weight charges respectively generated by the plurality of determination multiplication units and the total number of negative weight charges respectively generated by the plurality of determination multiplication units, and
  a determination unit for determining the number of multiply-accumulate signals of the plurality of multiply-accumulate signals output from the plurality of arithmetic apparatuses, which are smaller than the determination signal.

(10) The arithmetic apparatus according to (9), in which the number of multiply-accumulate devices which have a high possibility that the multiply-accumulate signal output from the output unit is lower than the noise level is determined on the basis of the number determined by the determination unit when electrical signals corresponding to a same input value are input in the plurality of input lines.

(11) The arithmetic apparatus according to any one of (1) to (10), in which the output unit includes an accumulation unit that accumulates at least one of the positive weight charge generated by the positive weight multiplication unit or the negative weight charge generated by the negative weight multiplication unit and performs threshold determination on a voltage, which is retained by the accumulation unit, with a predetermined threshold value, to thereby output the multiply-accumulate signal representing the sum of the product values.

(12) The arithmetic apparatus according to (11), in which the accumulation unit includes a positive charge accumulation unit capable of accumulating the positive weight charge generated by the positive weight multiplication unit and a negative charge accumulation unit capable of accumulating the negative weight charge generated by the negative weight multiplication unit, and
the output unit performs the threshold determination with the predetermined threshold value on each of the positive charge accumulation unit and the negative charge accumulation unit, to thereby output the multiply-accumulate signal.

(13) The arithmetic apparatus according to (11) or (12), in which
the predetermined threshold value is set on the basis of the duration of the input period.

(14) The arithmetic apparatus according to any one of (1) to (13), in which
the positive weight value and an absolute value of the negative weight value are fixed to a same value, and
the positive weight ratio is a ratio of the number of positive weight multiplication units to the number of multiplication units.

(15) The arithmetic apparatus according to any one of (1) to (14), in which
each of the plurality of multiply-accumulate devices includes a positive charge output line and a negative charge output line,
the plurality of multiplication units is provided to be associated with the plurality of input lines,
the positive weight multiplication unit includes a resistor that is connected between an associated input line of the plurality of input lines and the positive charge output line, defines the positive weight value, and has a non-linear characteristic, and outputs a positive weight charge corresponding to the product value to the positive charge output line, and
the negative weight multiplication unit includes a resistor that is connected between an associated input line of the plurality of input lines and the negative charge output line, defines the negative weight value, and has a non-linear characteristic, and outputs a negative weight charge corresponding to a product value to the negative charge output line.

(16) The arithmetic apparatus according to (15), in which
the resistor of the positive weight multiplication unit and the resistor of the negative weight multiplication unit have a same resistance value, and
the positive weight ratio is a ratio of the number of resistors of the positive weight multiplication units to the total number of resistors.

(17) The arithmetic apparatus according to any one of (8) to (10), in which
the determination circuit includes a positive charge output line and a negative charge output line,
the plurality of determination multiplication units is provided to be associated with the plurality of input lines, and
each of the plurality of determination multiplication units includes a common resistor that is connected to each of a portion between an associated input line of the plurality of input lines and the positive charge output line and a portion between an associated input line of the plurality of input lines and the negative charge output line and has a non-linear characteristic.

(18) The multiply-accumulate device according to any one of (15) to (17), in which
the resistor is a fixed resistance element, a variable resistance element, or an MOS transistor that operates in a sub-threshold region.

(19) A multiply-accumulate system, including:
a plurality of input lines into each of which an electrical signal corresponding to an input value is input within a predetermined input period;
a plurality of analog circuits each including
a plurality of multiplication units that each generates, on the basis of the electrical signal input into each of the plurality of input lines, a charge corresponding to a product value obtained by multiplying the input value by a weight value,
an output unit that accumulates a charge corresponding to the product value generated by each of the plurality of multiplication units and outputs, on the basis of the accumulated charge, a multiply-accumulate signal representing a sum of the product values, in which
the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a positive weight ratio that is a ratio of a sum total of the positive weight values to a sum total of absolute values of the weight values is any ratio of 0% to 100%, and
the output unit accumulates at least one of the positive weight charge generated by the positive weight multiplication unit or the negative weight charge generated by the negative weight multiplication unit, to thereby output the multiply-accumulate signal; and
a network circuit configured by connecting the plurality of analog circuits, in which
a duration of the input period is set on the basis of a distribution of the positive weight ratios of the plurality of multiply-accumulate devices.

(20) A setting method, including:
setting an input period for inputting an electrical signal into each of a plurality of input lines on the basis of a distribution of positive weight ratios of a plurality of multiply-accumulate devices each including
a plurality of multiplication units that each generates, on the basis of the electrical signal corresponding an input value that is input into each of the plurality of input lines, a charge corresponding to a product value obtained by multiplying the input value by a weight value,
an output unit that accumulates a charge corresponding to the product value generated by each of the plurality of multiplication units and outputs, on the basis of the accumulated charge, a multiply-accumulate signal representing a sum of the product values, in which
the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a positive weight ratio that is a ratio of a sum total of the positive weight values to a sum total of absolute values of the weight values is any ratio of 0% to 100%, and the output unit accumulates at least one of the positive weight charge generated by the positive weight multiplication unit or the negative weight charge generated by the negative weight multiplication unit, to thereby output the multiply-accumulate signal.

REFERENCE SIGNS LIST

T input period
θ threshold value
1 signal line
3 analog circuit
6 input signal line
7 pair of output lines
7a positive charge output line
7b negative charge output line
8 synapse circuit (multiplication unit)
8a synapse circuit (positive weight multiplication unit)
8b synapse circuit (negative weight multiplication unit)
9 neuron circuit
10 output signal line
11 accumulation unit
12 signal output unit
13 capacitor
17 resistor
20 comparator
21 signal generation unit
23 differential amplification circuit
40 noise burying determination circuit
41a positive charge output line of noise burying determination circuit
41b negative charge output line of noise burying determination circuit
42 synapse circuit of noise burying determination circuit
43 neuron circuit of noise burying determination circuit
44 comparator of noise burying determination circuit
45 resistor of noise burying determination circuit
100 arithmetic apparatus

The invention claimed is:

1. An arithmetic apparatus, comprising:
a plurality of input lines into each of which an electrical signal corresponding to an input value is input within a predetermined input period; and
a plurality of multiply-accumulate devices each including
a plurality of multiplication circuits that each generates, on a basis of the electrical signal input into each of the plurality of input lines, a charge corresponding to a product value obtained by multiplying the input value by a weight value, and
an output circuit that accumulates a charge corresponding to the product value generated by each of the plurality of multiplication circuits and outputs, on a basis of the accumulated charge, a multiply-accumulate signal representing a sum of the product values, in which
the plurality of multiplication circuits includes at least one of a positive weight multiplication circuit that generates a positive weight charge corresponding to a product value obtained by multiplying the input value by a positive weight value or a negative weight multiplication circuit that generates a negative weight charge corresponding to a product value obtained by multiplying the input value by a negative weight value, and is configured such that a positive weight ratio that is a ratio of a sum total of the positive weight values to a sum total of absolute values of the positive and negative weight values is any ratio of 0% to 100%, and
the output circuit accumulates at least one of the positive weight charge generated by the positive weight multiplication circuit or the negative weight charge generated by the negative weight multiplication circuit, to thereby output the multiply-accumulate signal, wherein
a duration of the predetermined input period is set on a basis of a distribution of respective positive weight ratios of the plurality of multiply-accumulate devices.

2. The arithmetic apparatus according to claim 1, wherein the electrical signal corresponding to the input value is a pulse signal having a duration of an ON time with respect to the predetermined input period, the duration corresponding to the input value.

3. The arithmetic apparatus according to claim 1, wherein the duration of the predetermined input period is set on a basis of at least one of an average or a variance of the respective positive weight ratios.

4. The arithmetic apparatus according to claim 1, wherein the duration of the predetermined input period is set to be longer as the respective positive weight ratios are distributed closer to a value of 50%.

5. The arithmetic apparatus according to claim 1, wherein the duration of the predetermined input period is set to be longer as the average of the respective positive weight ratios is closer to 50%.

6. The arithmetic apparatus according to claim 1, wherein the duration of the predetermined input period is, in a case where the average of the respective positive weight ratios is approximately 50%, set to be longer as the variance of the respective positive weight ratios is smaller.

7. The arithmetic apparatus according to claim 1, wherein the determination circuit includes
a plurality of determination multiplication circuits that each generates, on a basis of the electrical signal input into each of the plurality of input lines, a positive weight charge corresponding to a product value obtained by multiplying the input value by a positive weight value and a negative weight charge corresponding to a product value obtained by multiplying the input value by a negative weight value having an absolute value equal to the positive weight value,
a determination circuit output that outputs a determination signal on a basis of a charge corresponding to a difference between the total number of positive weight charges respectively generated by the plurality of determination multiplication circuits and the total number of negative weight charges respectively generated by the plurality of determination multiplication circuits, and
a determination circuit for determining a number of respective multiply-accumulate signals output from the plurality of multiply-accumulate devices, which are smaller than the determination signal.

8. The arithmetic apparatus according to claim 7, wherein the determination circuit includes a positive charge output line and a negative charge output line,
a plurality of determination multiplication circuits is provided to be associated with the plurality of input lines, and
each of the plurality of determination multiplication circuits includes a common resistor that is connected to each of a portion between an associated input line of the plurality of input lines and the positive charge output line and a portion between an associated input line of the plurality of input lines and the negative charge output line and has a non-linear characteristic.

9. The arithmetic apparatus according to claim 1, wherein the output circuit includes an accumulation circuit that accumulates at least one of the positive weight charge generated by the positive weight multiplication circuit or the negative weight charge generated by the negative weight multiplication circuit and performs threshold determination on a voltage, which is retained by the accumulation circuit, with a predetermined threshold value, to thereby output the multiply-accumulate signal representing the sum of the product values.

10. The arithmetic apparatus according to claim 9, wherein
the accumulation circuit includes a positive charge accumulation circuit capable of accumulating the positive weight charge generated by the positive weight multiplication circuit and a negative charge accumulation circuit capable of accumulating the negative weight charge generated by the negative weight multiplication circuit, and
the output circuit performs the threshold determination with the predetermined threshold value on each of the positive charge accumulation circuit and the negative charge accumulation circuit, to thereby output the multiply-accumulate signal.

11. The arithmetic apparatus according to claim 9, wherein
the predetermined threshold value is set on a basis of the duration of the predetermined input period.

12. The arithmetic apparatus according to claim 1, wherein
the positive weight value and an absolute value of the negative weight value are fixed to a same value, and
the positive weight ratio is a ratio of the number of positive weight multiplication circuits to the number of multiplication circuits.

13. The arithmetic apparatus according to claim 1, wherein
each of the plurality of multiply-accumulate devices includes a positive charge output line and a negative charge output line,
the plurality of multiplication circuits is provided to be associated with the plurality of input lines,
the positive weight multiplication circuit includes a resistor that is connected between an associated input line of the plurality of input lines and the positive charge output line, defines the positive weight value, and has a non-linear characteristic, and outputs a positive weight charge corresponding to the product value to the positive charge output line, and
the negative weight multiplication circuit includes a resistor that is connected between an associated input line of the plurality of input lines and the negative charge output line, defines the negative weight value, and has a non-linear characteristic, and outputs a negative weight charge corresponding to a product value to the negative charge output line.

14. The arithmetic apparatus according to claim 13, wherein
the resistor of the positive weight multiplication circuit and the resistor of the negative weight multiplication circuit have a same resistance value, and
the positive weight ratio is a ratio of the number of resistors of the positive weight multiplication circuits to the total number of resistors.

15. The multiply-accumulate device according to claim 13, wherein
the resistor is a fixed resistance element, a variable resistance element, or an MOS transistor that operates in a sub-threshold region.

16. A multiply-accumulate system, comprising:
a plurality of input lines into each of which an electrical signal corresponding to an input value is input within a predetermined input period;
a plurality of analog circuits each including
a plurality of multiplication circuits that each generates, on a basis of the electrical signal input into each of the plurality of input lines, a charge corresponding to a product value obtained by multiplying the input value by a weight value,
an output circuit that accumulates a charge corresponding to the product value generated by each of the plurality of multiplication circuits and outputs, on a basis of the accumulated charge, a multiply-accumulate signal representing a sum of the product values, in which
the plurality of multiplication circuits includes at least one of a positive weight multiplication circuit that generates a positive weight charge corresponding to a product value obtained by multiplying the input value by a positive weight value or a negative weight multiplication circuit that generates a negative weight charge corresponding to a product value obtained by multiplying the input value by a negative weight value, and is configured such that a positive weight ratio that is a ratio of a sum total of the positive weight values to a sum total of absolute values of the weight values is any ratio of 0% to 100%, and
the output circuit accumulates at least one of the positive weight charge generated by the positive weight multiplication circuit or the negative weight charge generated by the negative weight multiplication circuit, to thereby output the multiply-accumulate signal; and
a network circuit configured by connecting the plurality of analog circuits, wherein
a duration of the predetermined input period is set on a basis of a distribution of the respective positive weight ratios of the plurality of multiply-accumulate devices.

17. A setting method, comprising:
setting an input period for inputting an electrical signal into each of a plurality of input lines on a basis of a distribution of respective positive weight ratios of a plurality of multiply-accumulate devices each including
a plurality of multiplication circuits that each generates, on a basis of the electrical signal corresponding an input value that is input into each of the plurality of input lines, a charge corresponding to a product value obtained by multiplying the input value by a weight value,
an output circuit that accumulates a charge corresponding to the product value generated by each of the plurality of multiplication circuits and outputs, on a basis of the accumulated charge, a multiply-accumulate signal representing a sum of the product values, in which the plurality of multiplication circuits includes at least one of a positive weight multiplication circuit that generates a positive weight charge corresponding to a product value obtained by multiplying the input value by a positive weight value or a negative weight multiplication circuit that generates a negative weight charge corresponding to a product value obtained by multiplying the input value by a negative weight value, and is configured such that a positive weight ratio that is a ratio of a sum total of the positive weight values to a sum total of absolute values of the positive and negative weight values is any ratio of 0% to 100%, and the output circuit accumulates at least one of the positive weight charge generated by the positive weight multiplication circuit or the negative weight charge generated by the negative weight multiplication circuit, to thereby output the multiply-accumulate signal.

\* \* \* \* \*